(12) United States Patent
Galigekere et al.

(10) Patent No.: US 8,929,622 B2
(45) Date of Patent: Jan. 6, 2015

(54) METHOD AND APPARATUS FOR IN VITRO ANALYSIS OF THE PHYSICAL RESPONSE OF BLOOD-VESSELS TO VASO-ACTIVE AGENTS

(75) Inventors: Ramesh R. Galigekere, Manipal (IN); Mikkel Brydegaard Sørensen, Lund (SE); Rohit Nayak, Bhubaneshwar (IN); J. Prakasa Rao, Karnataka (IN)

(73) Assignee: Manipal Institute of Technology, Karnataka (IN)

( * ) Notice: Subject to any disclaimer, the term of this patent is extended or adjusted under 35 U.S.C. 154(b) by 884 days.

(21) Appl. No.: 12/634,260

(22) Filed: Dec. 9, 2009

(65) Prior Publication Data

US 2011/0135171 A1    Jun. 9, 2011

(51) Int. Cl.
| | |
|---|---|
| *G06K 9/00* | (2006.01) |
| *G06T 7/00* | (2006.01) |
| *G06T 7/60* | (2006.01) |
| *H04N 7/18* | (2006.01) |
| *G06T 7/40* | (2006.01) |

(52) U.S. Cl.
CPC .............. *H04N 7/181* (2013.01); *G06T 7/0081* (2013.01); *G06T 7/602* (2013.01); *G06T 2207/30101* (2013.01); *G06T 7/0012* (2013.01); *G06T 2207/10056* (2013.01); *G06T 2207/30024* (2013.01); *G06T 2207/20148* (2013.01); *G06K 2209/05* (2013.01); *G06T 2207/20104* (2013.01); *G06T 7/0097* (2013.01); *G06T 7/408* (2013.01); *G06T 2207/10024* (2013.01)
USPC ........................................................ 382/128

(58) Field of Classification Search
CPC ........................................................ G06K 9/00
USPC .................................................. 382/128–131
See application file for complete search history.

(56) References Cited

U.S. PATENT DOCUMENTS

| | | | | |
|---|---|---|---|---|
| 6,505,064 | B1 * | 1/2003 | Liu et al. ........................ | 600/420 |
| 7,020,314 | B1 * | 3/2006 | Suri et al. ...................... | 382/130 |
| 2004/0039266 | A1 * | 2/2004 | Hillier et al. .................. | 600/310 |
| 2006/0072799 | A1 * | 4/2006 | McLain ........................ | 382/128 |
| 2007/0038084 | A1 * | 2/2007 | Burla et al. ................... | 600/437 |
| 2009/0110273 | A1 * | 4/2009 | Shinoda et al. ............... | 382/165 |
| 2009/0202117 | A1 * | 8/2009 | Vilarino et al. ............... | 382/128 |
| 2010/0080757 | A1 * | 4/2010 | Haaga et al. .................. | 424/9.3 |
| 2010/0309198 | A1 * | 12/2010 | Kauffmann ................... | 345/419 |
| 2012/0057766 | A1 * | 3/2012 | Drozdzal et al. .............. | 382/128 |

OTHER PUBLICATIONS

Chen, et al. "Noninvasive imaging of in vivo blood flow velocity using optical Doppler tomography," Optics Letters. Jul. 15, 1997, vol. 22, No. 14.*

Chen, et al. "Optical Doppler Tomography," IEEE Journal of Selected Topics in Quantum Electronics, vol. 5, No. 4, Jul./Aug. 1999.*

(Continued)

*Primary Examiner* — Robert Sorey
(74) *Attorney, Agent, or Firm* — Foley & Lardner LLP

(57) ABSTRACT

A method includes determining, with a computing device, one or more of a hue value, a saturation value, and an intensity value of a pixel in a region of interest of an image of a blood vessel sample. A physical response of the blood vessel sample to a vaso-active agent is determined based at least in part on one or more of the hue value, the saturation value, and the intensity value.

18 Claims, 11 Drawing Sheets

(56) References Cited

OTHER PUBLICATIONS

"HSL and HSV", dated Nov. 17, 2008, Wikipedia, accessed on Jan. 3, 2013 at: http://en.wikipedia.org/w/index.php?title=HSL_and_HSV&oldid=252357201.*

Brizzolara-Gourdie, A. et al., "Angiotensin II Potentiates Vasodilation of Rat Aorta by cAMP Elevating Agnonists," *Journal of Pharmacology and Experimental Therepeutics*, vol. 281, No. 1, 1997, pp. 354-359.

Jachak, S. M. et al., "Challenges and opportunities in drug discovery from plants," *Current Science*, vol. 92, No. 9, May 10, 2007, pp. 1251-1257.

Liu, B. et al., "Automatic Extraction of Positive Cells in Tumor Immunohistochemical Pathology Image Based on YCbCr," *Proceedings of the 6th World Congress on Intelligent Control and Automation*, Jun. 21-23, 2006, pp. 9708-9712.

Nayak, R. et al., "In Vitro Study of the Physical Response of Blood-Vessels to Vaso-active Agents based on Colour-Image Processing," *Proc. $2^{nd}$ Cardiovascular Control Conference*, Dec. 9-12, 2008, pp. 20.

Park, J. et al., "Differences in sympathetic neuroeffector transmission to rat mesenteric arteries and veins as probed by in vitro continuous amerometry and video imaging," *J. Physiol.*, vol. 584, No. 3, 2007, pp. 819-834.

Tosun, M. et al., "Sarcoplasmic-endoplasmic reticulum $Ca^{2+}$—*ATPase inhibition prevents endothelin a receptor antagonism in rat aorta*," *Am. J. Physiol. Heart Circ. Physiol.*, vol. 292, 2007, pp. H1961-H1966.

Wallmark, J. T., "Inventors and patents at universities; the case of Chalmers University of Technology," *Technovation*, 1997, vol. 17, No. 3, 13 pp.

\* cited by examiner

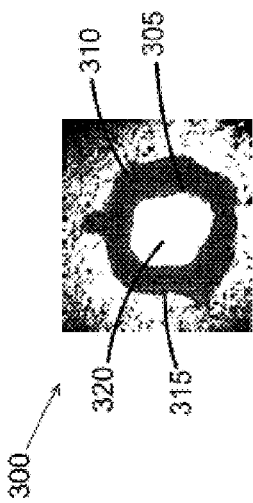
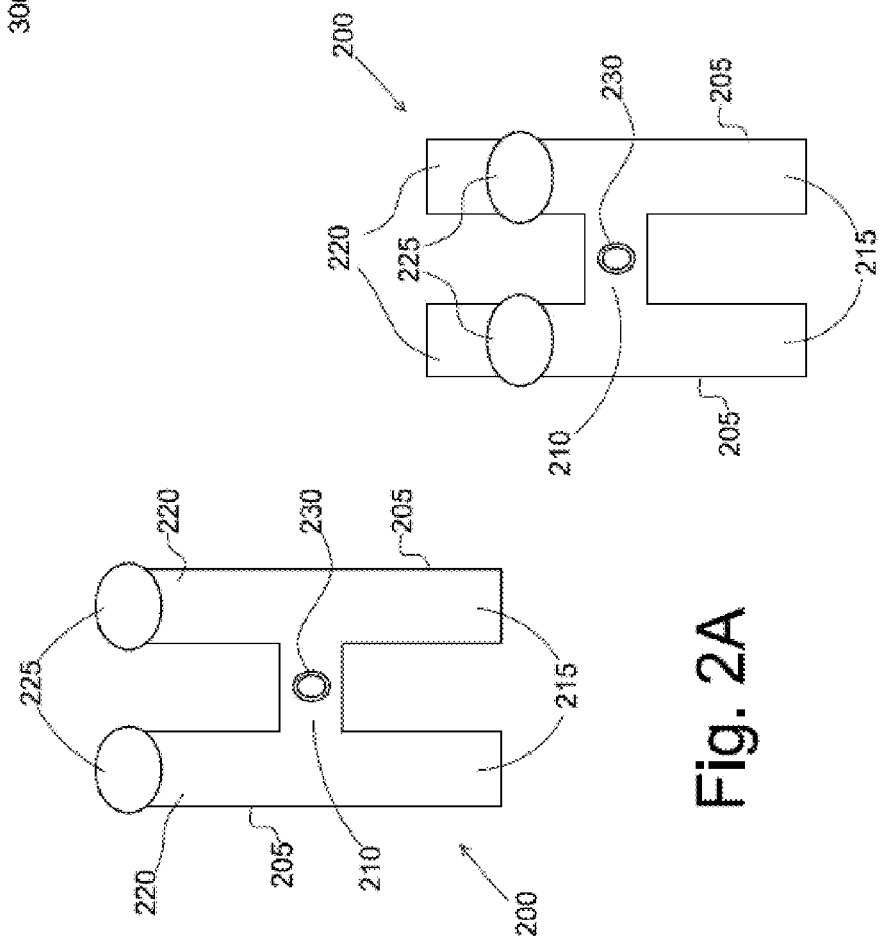

METHOD AND APPARATUS FOR IN VITRO ANALYSIS OF THE PHYSICAL RESPONSE OF BLOOD-VESSELS TO VASO-ACTIVE AGENTS

BACKGROUND

The following description is provided to assist the understanding of the reader. None of the information provided or references cited is admitted to be prior art.

Diseases affecting coronary blood vessels, cerebral blood vessels, renal blood vessels, etc. are common causes of disability and death among humans. One way in which researchers attempt to prevent and treat such diseases is by studying the affect of vaso-active agents on blood vessels. If a desirable response of a blood vessel is identified after application of a vaso-active agent to the blood vessel, the vaso-active agent that elicited the desirable response may be developed into a drug for use in treatment of a disease or condition affecting the blood vessel.

One traditional method for determining the response of a blood vessel to a vaso-active agent involves the use of a tension transducer. The tension transducer is anchored to a blood vessel sample, generally at two distinct locations of the blood vessel sample. The vaso-active agent is applied to the blood vessel sample, which may be located in an organ bath. The tension transducer is then used to measure a displacement of the blood vessel sample in response to the vaso-active agent.

SUMMARY

An illustrative method includes determining, with a computing device, one or more of a hue value, a saturation value, and an intensity value of a pixel in a region of interest of an image of a blood vessel sample. A physical response of the blood vessel sample to a vaso-active agent is determined based at least in part on one or more of the hue value, the saturation value, and the intensity value.

An illustrative system includes a memory and a processor operatively coupled to the memory. The memory is configured to store an image of a blood vessel sample. The processor is configured to determine one or more of a hue value, a saturation value, and an intensity value of a pixel in a region of interest of the image of the blood vessel sample. The processor is also configured to determine a physical response of the blood vessel sample to a vaso-active agent based at least in part on one or more of the hue value, the saturation value, and the intensity value.

An illustrative computer-readable medium has computer-readable instructions stored thereon. The computer-readable instructions include instructions for determining one or more of a hue value, a saturation value, and an intensity value of a pixel in a region of interest of an image of a blood vessel sample. The computer-readable instructions also include instructions for determining a physical response of the blood vessel sample to a vaso-active agent based at least in part on one or more of the hue value, the saturation value, and the intensity value.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 2A and 2B are top views of improved Neubauer sample chambers in accordance with an illustrative embodiment.

FIG. 3 depicts a blood vessel sample in accordance with an illustrative embodiment.

DETAILED DESCRIPTION

Figure 1:
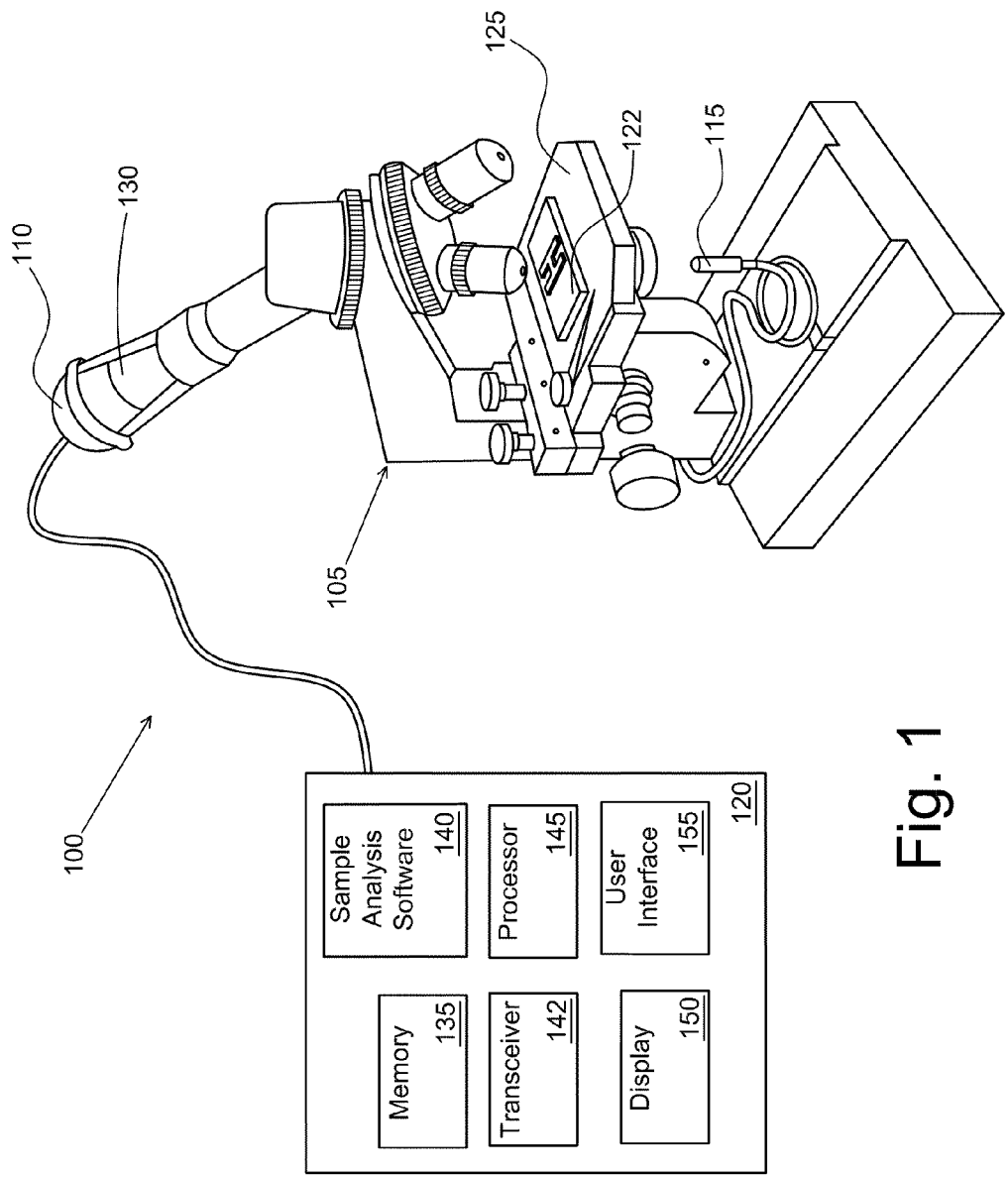
FIG. 1 depicts a blood vessel analysis system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein are illustrative systems, methods, computer-readable media, etc. for determining and analyzing a physical response of a blood vessel sample to a vaso-active agent. Traditional systems use a tension transducer to determine the physical response of a blood vessel sample. The inventors have perceived that the use of a tension transducer is inaccurate due in part to the anchorage of the tension transducer to the blood vessel sample. Due to the often small size of the blood vessel sample, the tension transducer used to the measure the response must also have high sensitivity. The inventors have perceived that the use of such high sensitivity tension transducers can be prohibitively expensive. In the embodiments described herein, the blood vessel sample does not have to be physically anchored within a sample chamber during the analysis. As such, dilation/contraction of the blood vessel in response to the vaso-active agent is not limited by anchorage points as can happen with traditional analysis procedures that utilize a tension transducer.

In an illustrative embodiment, a blood vessel sample, which can be a slice of any type of (human or non-human) blood vessel known to those of skill in the art, is placed into a sample chamber. Preparation of the blood vessel sample is described with reference to FIG. 4. The slice of blood vessel can be approximately 1 millimeter (mm) thick. Alternatively, blood vessel sample may be between approximately 0.9 mm-1.1 mm thick, between approximately 0.5 mm-1.5 mm thick, between approximately 0.1 mm and 3 mm thick, etc. The sample chamber can be an improved Neubauer chamber as described with reference to FIG. 2. Alternatively, any other type of sample chamber known to those of skill in the art may be used. The sample chamber can be placed onto a sample platform of a microscope. Any type of microscope known to those of skill in the art may be used.

A camera is mounted to an eyepiece of the microscope using fasteners, straps, rubber bands, etc. The camera can be a web camera, a digital still camera, a digital video camera, etc. The camera is used to capture images of the blood vessel sample before, during, and after application of the vaso-active agent to the blood vessel sample. Illustrative frame rates of image capture by the camera can include 40 frames/second, 20 frames/second, 5 frames/second, 1 frame/second, 0.5 frames/second, etc. Illustrative durations of image capture can be 10 seconds, 30 seconds, 1 minute, 3 minutes, 5 minutes, 10 minutes, etc.

The vaso-active agent can be adrenaline, caffeine, potassium chloride, acetylcholine, angiotensin, vasopressin, histamine, bradykinin, vaso-active intestinal peptides, and/or other vaso-active agents known to those of skill in the art. In one embodiment, between approximately 2 micro-liters and 20 micro-liters of the vaso-active agent can be applied, depending on the type of vaso-active agent. Alternatively, a smaller or larger quantity of the vaso-active agent may be used. The vaso-active agent can be applied automatically with an infusion pump as known to those of skill in the art or manually using a micro-pipette, dropper, etc., depending on the embodiment.

The captured images of the blood vessel sample can be analyzed using a computing device. The computing device can include a processor, a memory, a user interface, etc. as known to those of skill in the art. In one embodiment, a user can use the user interface of the computing device to specify a region of interest on at least one of the captured images. The region of interest can include a lumen of the blood vessel sample and an amount of tissue surrounding the lumen. In an illustrative embodiment, the region of interest is large enough such that the lumen will remain in the region of interest in the event that the lumen dilates in response to the vaso-active agent. The amount of tissue surrounding the lumen that is within the region of interest is selected accordingly. An illustrative region of interest is described and illustrated with reference to FIGS. 5 and 6.

Sample analysis software can be used to analyze the captured images of the blood vessel sample and to determine a physical response of the blood vessel sample to the vaso-active agent. The physical response can be a dilation of the lumen, a contraction of the lumen, a change in shape of the lumen, etc. The sample analysis software can be written in any programming language known to those of skill in the art. In one embodiment, the sample analysis software can be written using Matlab as known to those of skill in the art. In one embodiment, the sample analysis software can be a standalone application.

In an illustrative embodiment, the sample analysis software can transpose the region of interest, which may be specified by the user on a single captured image, onto each of the captured images. The sample analysis software can also determine a hue value, a saturation value, and/or an intensity value for each pixel within the region of interest for each of the captured images. The hue value can be a measure of the quality of a color of the pixel as determined by the dominant wavelength of the color, as known to those of skill in the art. The saturation value can be a measure of the difference of a color of the pixel relative to the brightness of the color as known to those of skill in the art. The intensity value can be a measure of the brightness or dullness of a color of the pixel. In one embodiment, the hue, saturation, and/or intensity (HSI) values can be determined based at least in part on a red value, a green value, and a blue value of each pixel in the region of interest for each captured image. The red, green, and blue (RGB) values, each of which is a color component value corresponding to its respective color as known to those of skill in the art, can be determined according to any method known to those of skill in the art. In one embodiment, the hue value may not be determined. In such an embodiment, only the saturation value may be determined, only the intensity value may be determined, and/or both the hue and saturation values may be determined.

In an illustrative embodiment, one or more of the hue value, the saturation value, and the intensity value for a given pixel of a captured image can be used to determine whether the given pixel is within the lumen of the blood vessel sample or the tissue surrounding the blood vessel sample. Various embodiments for making the determination are described in detail with reference to FIGS. 5, 8, and 9. A determination of whether a pixel is in the lumen or tissue can be made for each pixel in the region of interest in each of the captured images. Alternatively, only a subset of the captured images may be used. The number of pixels within the lumen in a given captured image is proportional to the area of the lumen in that image. As such, the area of the lumen in each captured image can be determined by multiplying the area of the pixel by the number of pixels that are within the lumen. In an illustrative embodiment, each image can be associated with a timestamp such that a plot of the area of the lumen as a function of time can be generated. Additional embodiments and details are described with reference to the figures.

FIG. 1 depicts a blood vessel analysis system 100 in accordance with an illustrative embodiment. Blood vessel analysis system (or system) 100 includes a microscope 105, a camera 110, a light source 115, a computing device 120, and a chamber 122. In alternative embodiments, system 100 may include additional, fewer, and/or different components. Microscope 105, which can be a compound microscope as known to those of skill in the art, includes a sample platform 125 and an eyepiece 130. Microscope 105 can also include a plurality of lenses, focal adjustments, and other standard components as known to those of skill in the art. Sample platform 125 can be a flat surface configured for receiving a blood vessel sample that is to be viewed using microscope 105 as known to those of skill in the art. In one embodiment, at least a portion of sample platform 125 is transparent such that light provided by light source 115 from below sample platform 125 can be used to uniformly illuminate the blood vessel sample.

Chamber 122 is positioned on sample platform and can be used to hold the blood vessel sample such that the blood vessel sample can be viewed and analyzed by blood vessel analysis system 100. In one embodiment, chamber 122 can be detachably mounted to sample platform 125 by any method known to those of skill in the art. Alternatively, chamber 122 may not be mounted to sample platform 125. In an illustrative embodiment, chamber 122 can be a perfusion chamber such as an improved Neubauer chamber. Alternatively, other types of sample chambers known to those of skill in the art may be used. An illustrative chamber is described with reference to FIGS. 2A and 2B.

Eyepiece 130 can be a standard microscope eyepiece as known to those of skill in the art. Camera 110 is mounted to eyepiece 130 such that camera 110 is able to capture images of a sample located on sample platform 125 through eyepiece 130. In an illustrative embodiment, camera 110 can be detachably mounted to eyepiece 130 using fasteners, straps, tape, rubber bands, etc. As known those of skill in the art, the field of view, magnification, etc. of microscope 105 can be adjusted to provide a clear view through eyepiece 130 of the sample located on sample platform 125. The adjustments can be made manually by a user or automatically through computing device 120, depending on the type of microscope 105. Adjustment of the field of view of an illustrative microscope is described in more detail with reference to FIG. 4.

In one embodiment, camera 110 can be a Q-Tec brand 100K video web camera as known to those of skill in the art, and images of the sample can be extracted from video frames of the video captured by camera 110. Alternatively, other video web cameras known to those of skill in the art may be used. In another alternative embodiment, camera 110 may be a standard digital camera, a standard video camera, or other type of camera known to those of skill in the art. In an illustrative embodiment, camera 110 can be connected to computing device 120 through a wired or wireless connection as known to those of skill in the art. If camera 110 is connected to computing device 120 through a wired connection such as a universal serial bus (USB) cable, camera 110 can receive power and/or control information through computing device 120. Alternatively, camera 110 may receive power from a battery, an electrical outlet, etc. The control information can include an on/off command, a start/stop image capture command, a focus command, a zoom command, a frame rate command, a duration of image capture command, etc. In one embodiment, camera 110 can also be manually controlled. Illustrative commands for controlling an illustrative camera are described in detail with reference to FIG. 4.

In an illustrative embodiment, light source 115 is positioned underneath sample platform 125 and configured to illuminate a blood vessel sample placed on sample platform 125. In one embodiment, light source 115 can be detachably mounted to an underside of sample platform 125, to a base of microscope 105, and/or to another component of microscope 105. Alternatively, light source 115 may be placed above or to the side of the blood vessel sample. In an illustrative embodiment, light source 115 may be connected to a USB port of computing device 120 and can receive power and/or control information through the USB port. The control information can include an on/off command, an intensity adjustment command, etc. In an alternative embodiment, light source 115 may not be connected to computing device 120. In such an embodiment, light source 115 can be manually controlled and can receive power from another source such as a battery, an electrical outlet, etc.

Computing device 120 can be a desktop computer, a laptop computer, a cloud computing client, a hand-held computing device, or other type of computing device known to those of skill in the art. Computing device 120 includes, a memory 135, sample analysis software 140, a transceiver 142, a processor 145, a display 150, and a user interface 155. In alternative embodiments, computing device 120 may include fewer, additional, and/or different components. Memory 135, which can be any type of permanent or removable computer memory known to those of skill in the art, can be a computer-readable storage medium. Memory 135 is configured to store sample analysis software 140, an application configured to run sample analysis software 140, captured image data, and/or other information and applications as known to those of skill in the art. Transceiver 142 of computing device 120 can be used to receive and/or transmit information through a wired or wireless network as known to those of skill in the art. Transceiver 142, which can include a receiver and/or a transmitter, can be a modem or other communication component known to those of skill in the art.

Sample analysis software 140 is configured to analyze captured images of a blood vessel sample that are received from camera 110. The captured images can be received by computing device 120 through a wired connection such as a USB cable and/or through a wireless connection, depending on the embodiment. The captured images may include the blood vessel sample before, during, and after application of a vaso-active agent to the blood vessel sample. Sample analysis software 140, which can be implemented as computer-readable instructions configured to be stored on memory 135, can analyze the captured images to determine a response of the blood vessel sample to the application of the vaso-active agent. The response can be a change in area of the lumen of the blood vessel sample, a change in shape of the blood vessel sample, etc.

In one embodiment, sample analysis software 140 can include a computer program and/or an application configured to execute the program such as Matlab. Alternatively, other programming languages and/or applications known to those of skill in the art can be used. In one embodiment, sample analysis software 140 can be a dedicated standalone application. Processor 145, which can be in electrical communication with each of the components of computing device 120, can be used to run the application and to execute the instructions of sample analysis software 140. Any type of computer processor(s) known to those of skill in the art may be used.

In one embodiment, sample analysis software 140 can determine the area of the lumen of the blood vessel sample in each captured image, and plot the area over time such that any change in the area can be analyzed. The area can be determined using hue, saturation, and/or intensity (HSI) properties of the images along with threshold(s) that are determined using the maximum entropy principle as known to those of skill in the art. Such a process is described with reference to FIG. 5. In one embodiment, the area can be determined based on an analysis of normalized pixel values within regions of interest of the captured images. Such a process is described with reference to FIG. 8. In another embodiment, the area can be determined based on the area associated with a peak of an intensity histogram corresponding to a region of interest of a captured image. Such a process is described with reference to FIG. 9.

Display 150 of computing device 120 can be used to display one or more images of the blood vessel sample, a user interface window through which a user can control camera 110, light source 115, sample analysis software 140, etc., plots illustrating the response of the blood vessel sample, etc. Display 150 can be a liquid crystal display, a cathode ray tube display, or other type of display known to those of skill in the art. User interface 155 allows a user to interact with computing device 120 and to enter information into the user interface window. User interface 155 can include a mouse, a keyboard, a touch screen, a touch pad, etc. The user can use user interface 155 to control the on/off status of light source 115, the intensity of light source 115, the on/off status of camera 110, the zoom of camera 110, the focus of camera 110, the frame rate of camera 110, the duration for which camera 110 captures images, to adjust a field of view of microscope 105, etc. As described in more detail below with reference to FIGS. 5-6, the user can also use user interface 155 to specify a region of interest on an image of the blood vessel sample.

In the embodiment illustrated with reference to FIG. 1, microscope 105, camera 110, light source 115, computing device 120, and chamber 122 are illustrated as separate components that are combined to form blood vessel analysis system 100. In an alternative embodiment, any or all of the components blood vessel analysis system 100 may be integrated into a dedicated stand-alone apparatus that has the functionality described with reference to FIG. 1.

FIGS. 2A and 2B are top views of improved Neubauer sample chambers 200 in accordance with an illustrative embodiment. In one embodiment, the improved Neubauer sample chamber used can be a Spencer Bright Line brand improved Neubauer sample chamber as known to those of skill in the art. Alternatively, other models known to those of skill in the art may be used. Sample chamber 200 has two side limbs 205 and a central cavity 210 connected in between side limbs 205. In an illustrative embodiment, side limbs 205 can be troughs and central cavity 210 can be a trough having a greater depth than that of side limbs 205. As such, a fluid, such as a vaso-active agent, introduced into open ends 215 of side limbs 205 can collect in central cavity 210. In one embodiment, the vaso-active agent can be introduced using an infusion pump as known to those of skill in the art. Alternatively, the vaso-active agent may be manually introduced using a micro-pipette, dropper, etc. Introduction of the vaso-active agent is described in more detail with reference to FIG. 4. Caps 220 can be used to form closed ends 225 of side limbs 205 to help prevent leakage of the vaso-active agent. In FIG. 2A, caps 220 are at the ends of side limbs 205. In FIG. 2B, caps 220 are located along side limbs 205, closer to central cavity 210. In one embodiment, caps 220 can be formed from plasticin. Alternatively, other material(s) known to those of skill in the art may be used.

In an illustrative embodiment, central cavity 210 is used to hold a blood vessel sample 230. In an illustrative embodiment, central cavity 210 does not include any fluid when blood vessel sample 230 is placed therein. Once blood vessel sample 230 is placed into central cavity 210, a cover (not shown) may be placed over central cavity 210 and blood vessel sample 230 to help prevent contamination. The cover can also be used to help prevent movement of blood vessel sample 230 while the vaso-active agent is being introduced. The cover may extend over at least a portion of side limbs 205. In one embodiment, the cover can rest at least in part on the outer edges of side limbs 205.

FIG. 3 depicts a blood vessel sample 300 in accordance with an illustrative embodiment. Blood vessel sample 300, which can be from a human or non-human subject, is a cross-section (or slice) of a blood vessel such as an artery, vein, etc. In an illustrative embodiment, blood vessel sample 300 can be approximately 1 millimeter (mm) thick. Alternatively, blood vessel sample 300 may be between approximately 0.9 mm-1.1 mm thick, between approximately 0.5 mm-1.5 mm thick, between approximately 0.1 mm and 3 mm thick, etc. Blood vessel sample 300 includes an inner layer 305 (or tunica intima) of tissue, a middle layer 310 (or tunica media) of tissue, an outer layer 315 (or tunica adventitia) of tissue, and a lumen 320. Lumen 320 can have an area of between approximately 2-3 mm. Alternatively, blood vessel samples having lumens with larger or smaller areas may also be used. As discussed in more detail with reference to FIGS. 4-5 and 8-9, a change in area of lumen 320 can be used to determine a physical response of blood vessel sample 300 that results from application of a vaso-active agent. Based on the physical response, researchers can develop new drugs for treatment of blood vessel disorders and diseases that include the vaso-active agent, improve drugs that include the vaso-active agent, identify new vaso-active agents, develop new blood vessel treatment procedures, validate the effects of drugs including the vaso-active agent, study blood vessel receptor physiology, etc.

Figure 4:
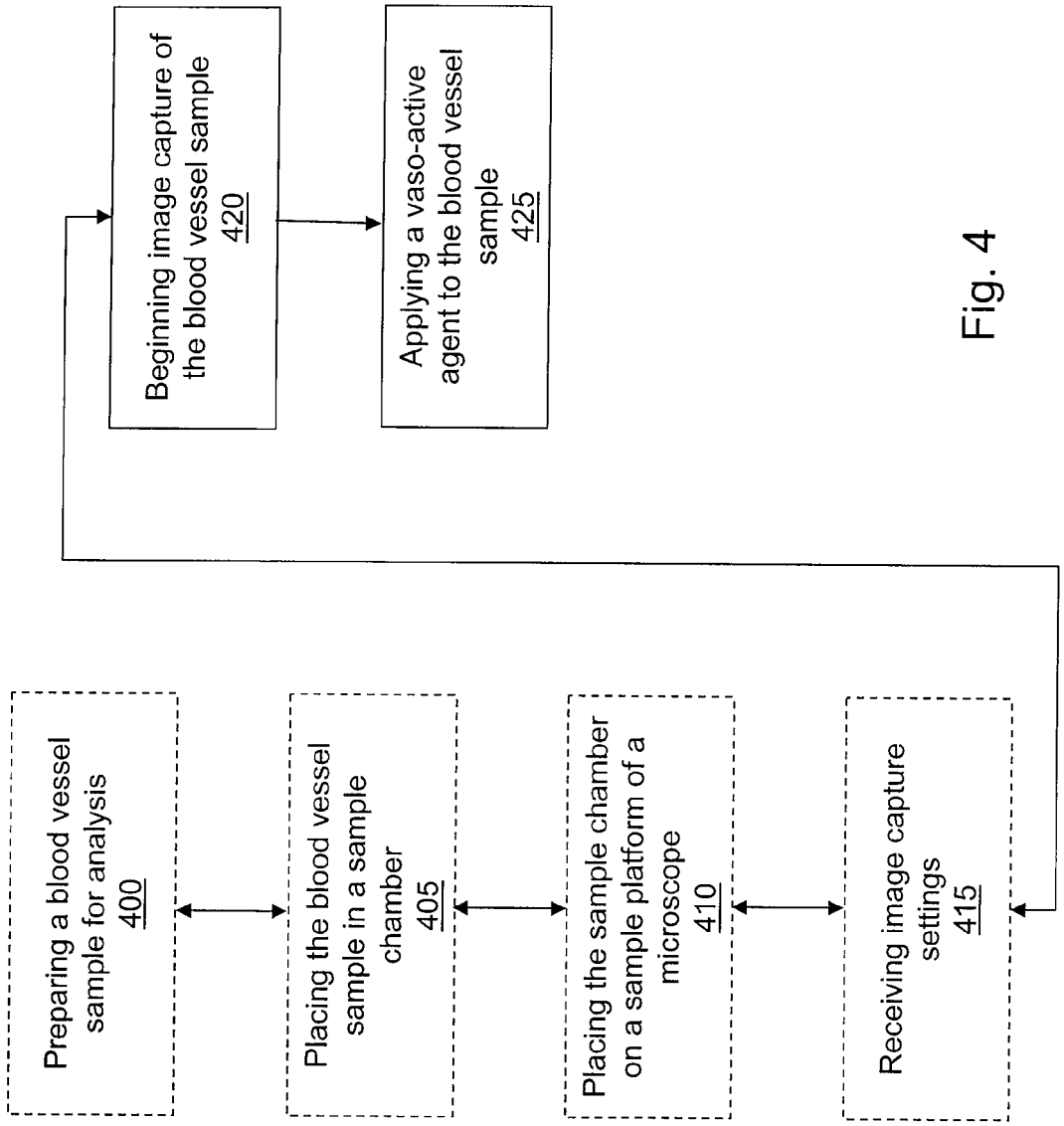
FIG. 4 is a flow diagram illustrating operations performed to capture images of a blood vessel sample in accordance with an illustrative embodiment.

FIG. 4 is a flow diagram illustrating operations performed to capture images of a blood vessel sample in accordance with an illustrative embodiment. In alternative embodiments, fewer, additional, and/or different operations may be performed. The use of dashed boxes and double arrows in FIG. 4 refers to operations that may be optional. The blood vessel sample is prepared for analysis in an operation 400. The blood vessel sample can be from a human subject or a non-human subject, depending on the embodiment. In one embodiment, the blood vessel sample can be from an aorta of a frog (rana tigrina). The frog may be dead or incapacitated as known to those of skill in the art at the time of extraction of the blood vessel sample. A researcher can open the thoracic cavity of the frog with crude scissors as known to those of skill in the art and dissect a slice of the aorta using fine scissors as known to those of skill in the art. Alternatively, other blood vessels other than an aorta may be used to obtain the blood vessel sample. In an illustrative embodiment, the blood vessel sample can be approximately 1 millimeter (mm) thick. Alternatively, the blood vessel sample may be between approximately 0.9 mm-1.1 mm thick, between approximately 0.5 mm-1.5 mm thick, between approximately 0.1 mm and 3 mm thick, etc. The blood vessel sample may be stored in a ringer solution as known to those of skill in the art prior to placement of the blood vessel sample into the sample chamber. Depending in the type of blood vessel sample, the ringer solution may be aerated (i.e., with oxygen, etc.). For example, a blood vessel sample taken from a human can be preserved (prior to analysis) by being held in an aerated ringer solution.

The blood vessel sample is placed into a sample chamber (such as sample chamber 200 described with reference to FIGS. 2A and 2B) in an operation 405. In alternative embodiments, other chambers known to those of skill in the art may be used. A cover may be placed over the blood vessel sample and at least a portion of the sample chamber to help protect the blood vessel sample from contamination and to prevent movement of the blood vessel sample upon application of the vaso-active agent. The sample chamber is placed on a sample platform of a microscope (such as sample platform 125 of microscope 105 described with reference to FIG. 1) in an operation 410. In an illustrative embodiment, the sample chamber is positioned such that the lumen of the blood vessel sample and at least a portion of the tissue surrounding the lumen are within a field of view of the camera that is used to capture images of the blood vessel sample. In another illustrative embodiment, the field of view can be large enough to ensure that the lumen and at least a portion of the tissue surrounding the lumen remain in the field of view if the size of the lumen changes and/or if the blood vessel sample moves slightly upon application of the vaso-active agent.

The camera and/or the microscope to which the camera is mounted may also be used to adjust the field of view as known to those of skill in the art. Adjustments of the camera and/or microscope may be performed manually by a user or through a computing device (such as computing device 120) to which the camera and/or microscope are connected. In one embodiment, the field of view of the camera may be presented to the user through a user interface window on a display of the computing device. In such an embodiment, the user can adjust the location of the sample chamber, the camera settings, and/or the microscope settings until a desirable field of view is presented in the user interface window. In an illustrative embodiment, the blood vessel sample is centered within the field of view. In another illustrative embodiment, a light source (such as light source 115) used to illuminate the blood vessel sample may be adjusted such that the illumination is uniform over the lumen of the blood vessel sample.

Image capture settings are received in an operation 415. In an illustrative embodiment, the image capture settings can include a frame rate. Illustrative frame rates can include 40 frames/second, 20 frames/second, 5 frames/second, 1 frame/second, 0.5 frames/second, etc. The frame rate can be determined based at least in part on the rate of application of the vaso-active agent and/or an expected rate of the reaction between the blood vessel sample and a vaso-active agent to be applied to the blood vessel sample. As such, higher frame rates can be used for fast reactions and lower frame rates can be used for slower reactions. The image capture settings can also include a duration of image capture. In an illustrative embodiment, images are captured before, during, and after application of the vaso-active agent to the blood vessel sample. The duration of image capture can be based at least in part on the rate of application of the vaso-active agent and/or an expected length of the reaction between the blood vessel sample and the vaso-active agent. Illustrative durations of image capture can be 10 seconds, 30 seconds, 1 minute, 3 minutes, 5 minutes, 10 minutes, etc. The frame rate and/or the duration of image capture may also be based at least in part on an amount of memory of computing device that is available to store captured images. In an illustrative embodiment, the image capture settings can be specified by a user through a user interface of the computing device. In an alternative embodiment, predetermined values of any of the image capture settings may be used.

Image capture of the prepared blood vessel begins in an operation 420. The images can be captured as video having a frame rate as indicated above and using a camera such as camera 110 described with reference to FIG. 1. Alternatively, the images may be captured as successive still images. As indicated above, image capture can begin a predetermined time prior to application of a vaso-active agent to the blood vessel sample. The predetermined time can be 2 minutes, 1 minute, 40 seconds, 20 seconds, 10 seconds, etc. As such, an initial state of the blood vessel sample can be captured. In an illustrative embodiment, a time stamp can be associated with each captured image such that a plot of the area of the lumen can be plotted as a function of time.

The vaso-active agent is applied to the blood vessel sample in an operation 425. The vaso-active agent can be applied using an infusion pump. Alternatively, the vaso-active agent may be applied manually with a micropipette, a dropper, etc. In one embodiment, between approximately 2 micro-liters and 20 micro-liters of the vaso-active agent can be applied, depending on the type of vaso-active agent. Alternatively, a smaller or larger quantity of the vaso-active agent may be used. The vaso-active agent can be adrenaline, caffeine, potassium chloride, acetylcholine, angiotensin, vasopressin, histamine, bradykinin, vaso-active intestinal peptides, and/or other vaso-active agents known to those of skill in the art. In an illustrative embodiment, the images continue to be captured during application of the vaso-active agent and for an amount of time after application of the vaso-active agent. The total duration of image capture can be 10 seconds, 30 seconds, 1 minute, 3 minutes, 5 minutes, 10 minutes, etc., depending on the type of vaso-active agent, the rate of application of the vaso-active agent, the type and/or size of the blood vessel sample, etc. In an embodiment in which the vaso-active agent is automatically applied using an infusion pump, the time(s) (i.e., start time, end time, duration, etc.) at which the vaso-active agent is applied can be recorded for later correlation with the captured images.

Figure 5:
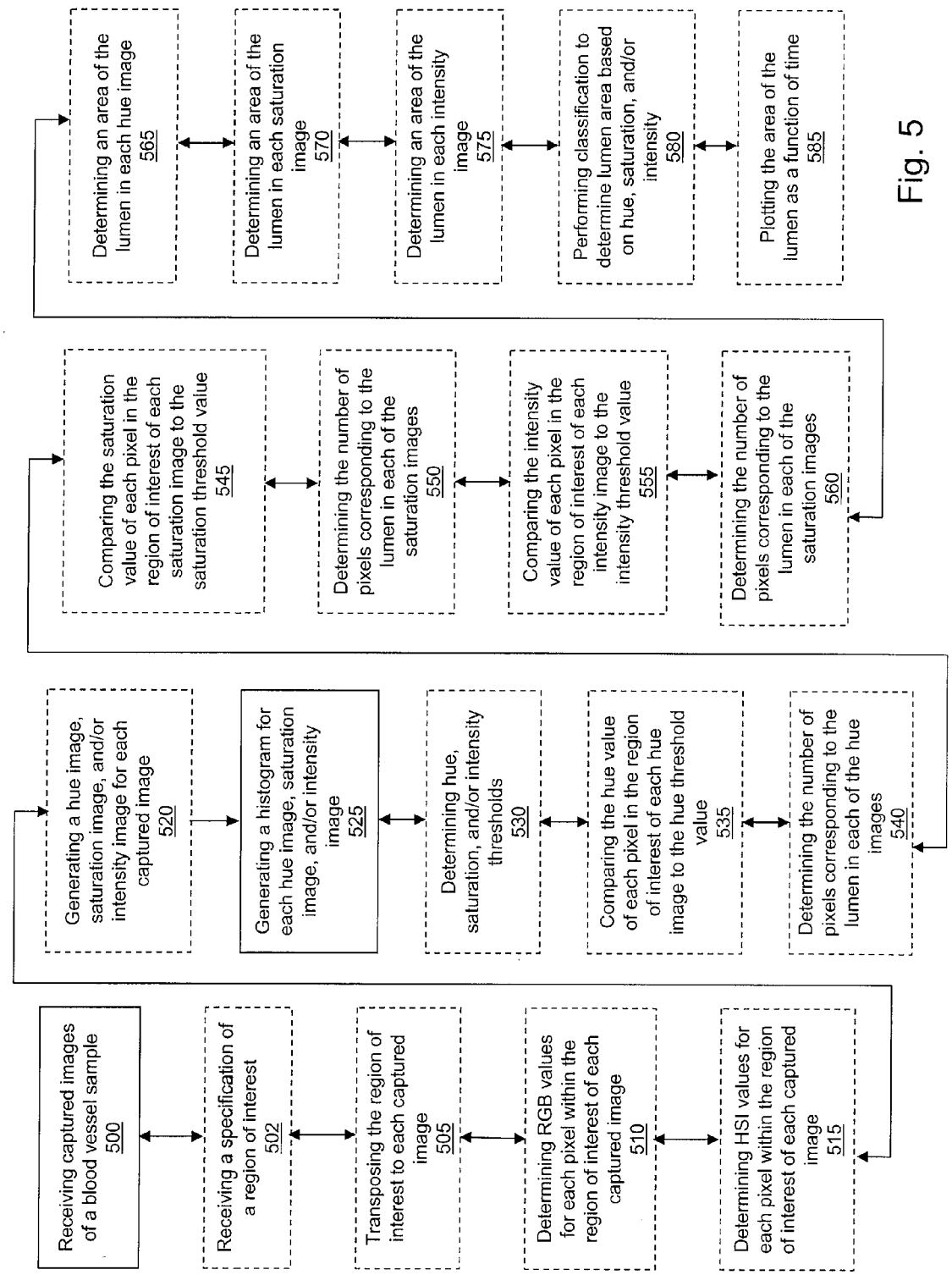
FIG. 5 is a flow diagram illustrating blood vessel sample analysis operations performed in accordance with a first illustrative embodiment.

FIG. 5 is a flow diagram illustrating blood vessel sample analysis operations in accordance with a first illustrative embodiment. In alternative embodiments, fewer, additional, and/or different operations may be performed. The use of dashed boxes and double arrows in FIG. 5 refers to operations that may be optional. In an illustrative embodiment, the blood vessel sample analysis operations can be performed by sample analysis software 140 described with reference to FIG. 1. Captured images of a blood vessel sample are received in an operation 500. The images can be captured as described with reference to FIG. 4. The captured images can be received at a computing device such as computing device 120 described with reference to FIG. 1 through a wired or wireless connection with a camera. A specification of a region of interest is received in an operation 502. The region of interest can be a region of an image of the blood vessel sample that includes a lumen of the blood vessel sample and a small portion of the tissue surrounding the blood vessel sample. The region of interest can be specified by a user through a user interface window of a computing device such as computing device 120 described with reference to FIG. 1. The user interface window can include a captured image of the blood vessel sample. The captured image can be any image that is captured prior to application of the vaso-active agent to the blood vessel sample.

In an illustrative embodiment, the user can specify the region of interest (on the captured image of the blood vessel sample) as a polygon surrounding the lumen and the small portion of the tissue surrounding the lumen through a user interface of the computing device. The region of interest, which can be specified on a single captured image, can be transposed to all of the captured images for subsequent analysis. As such, the region of interest can be large enough to include the lumen in subsequent images (i.e., images captured during and/or after application of the vaso-active agent) even if the lumen dilates in response to the vaso-active agent. In an alternative embodiment, the field of view of the camera may be set to include only the lumen and the small portion of the tissue surrounding the lumen. In such an embodiment, the region of interest can be the entire captured image and a user may not specify the region of interest.

Figure 6:
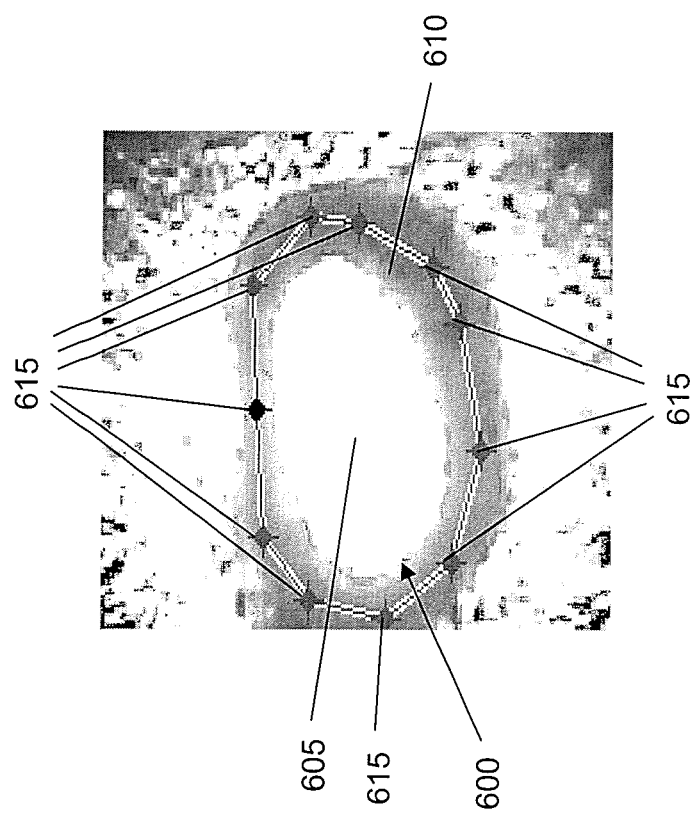
FIG. 6 depicts a specified region of interest in accordance with an illustrative embodiment.

FIG. 6 depicts an illustrative specified region of interest 600 in accordance with an illustrative embodiment. As illustrated in FIG. 6, region of interest 600 includes a lumen 605 and tissue 610 of the blood vessel sample. Tissue 610 can include at least a portion of an inner layer of the blood vessel sample and/or at least a portion of a middle layer of the blood vessel sample as described with reference to FIG. 3. In addition, region of interest 600 is large enough to account for an increase in size of lumen 605 as a result of dilation of the blood vessel sample in response to application of the vaso-active agent. Region of interest 600 can also be large enough to account for slight movement of the blood vessel sample due to introduction of the vaso-active agent. The user can specify region of interest 600 by marking, with a user interface of a computing device, a plurality of points 615 in tissue 610 of the blood vessel sample. The blood sample analysis software can connect points 615 with lines to form region of interest 600, which can be a polygon whose shape depends on the number of points 615 and the shape of the blood vessel sample. As such, region of interest 600 can be a reference area used to help determine the area of lumen 605 in each of the captured images of the blood vessel sample.

Referring again to FIG. 5, the region of interest, which may be specified on only a single captured image, is transposed onto each of the captured images of the blood vessel sample in an operation 505. As such, each captured image has the same region of interest, which includes the lumen of the vessel. In an embodiment in which the region of interest is not specified by a user (i.e., embodiments in which the field of view is adjusted to include only the lumen and the small portion of tissue surrounding the lumen), the region of interest is not transposed onto other captured images.

The red, green, and blue (i.e., RGB) values for each pixel within the region of interest of each captured image of the blood vessel sample are determined in an operation 510. The RGB values, each of which is a color component value corresponding to its respective color as known to those of skill in the art, can be determined according to any method known to those of skill in the art. The hue, saturation, and/or intensity (i.e., HSI) values are determined for each pixel in the region of interest in each of the images in an operation 515. The hue value can be a measure of the quality of a color of the pixel as determined by the dominant wavelength of the color, as known to those of skill in the art. The saturation value can be a measure of the difference of a color of the pixel relative to the brightness of the color as known to those of skill in the art. The intensity value can be a measure of the brightness or dullness of a color of the pixel. In an illustrative embodiment, the hue, saturation, and/or intensity values are determined based at least in part on the red, green, and blue values determined in operation 510. The hue (H), saturation (S), and/or intensity (I) values can be determined according to the following equations:

$$H = \begin{cases} \theta, & B \leq G \\ 360 - \theta, & B > G \end{cases},$$

where $$\theta = \cos^{-1}\left\{ \frac{\frac{1}{2}[(R-G)+(R-B)]}{\sqrt{(R-G)^2+(R-B)(G-B)}} \right\},$$

$$S = 1 - \frac{3}{(R+G+B)}\text{Min}\{R, G, B\},$$

and $$I = \frac{1}{3}(R+G+B)$$

In the equations above, R is the red value of a given pixel, G is the green value of the given pixel, and B is the blue value of the given pixel. In one embodiment, the values of S and I can be in the range [0,1]. The angle $\theta$, which can be modeled as an angle measured from a red axis of the hue, saturation, intensity (HSI) space as known to those of skill in the art, can also be in the range [0,1]. In one embodiment, any of the hue value, the saturation value, and the intensity value may not be calculated.

A hue image based on the hue values of the pixels in the region of interest, a saturation image based on the saturation values of the pixels in the region of interest, and/or an intensity image based on the intensity values of the pixels in the region of interest are generated for each of the captured images in an operation 520. In an illustrative embodiment, each hue image can be a generated image in which the individual pixels have the hue values determined in operation 515. Similarly, each saturation image can be a generated image in which the individual pixels have the saturation values determined in operation 515 and each intensity image can be a generated image in which the individual pixels have the intensity values determined in operation 515. In one embodiment, any of the hue image, the saturation image, and the intensity image may not be generated.

Figure 11A:
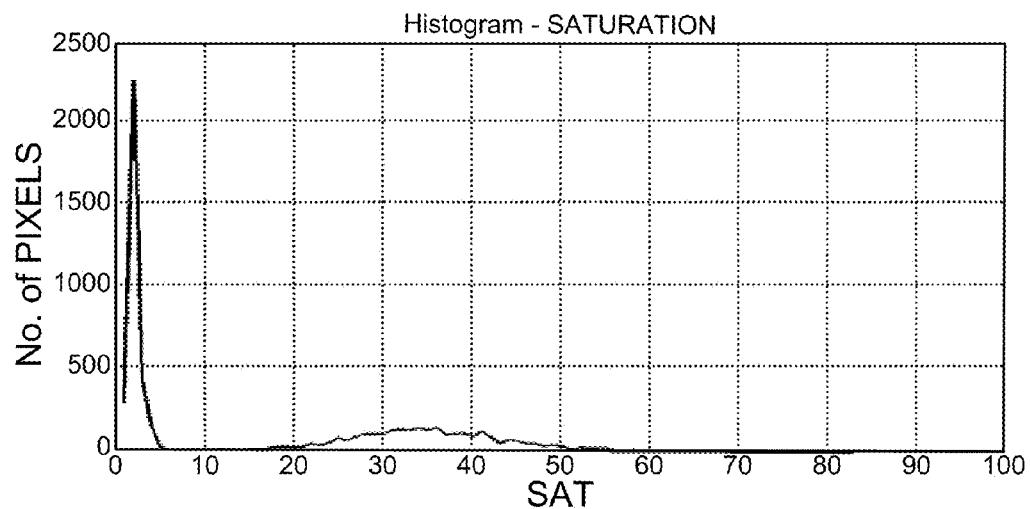
FIGS. 11A and 11B illustrate histograms in accordance with an illustrative embodiment.

A hue histogram is generated for each of the hue images, a saturation histogram is generated for each of the saturation images, and/or an intensity histogram is generated for each of the intensity images in an operation 525. As known to those of skill in the art, a histogram of an image can refer to a graphical representation of a distribution of an image property, such as hue, saturation, or intensity, in the image. In an illustrative embodiment, each of the histograms may be normalized histograms as known to those of skill in the art. Alternatively, normalized histograms may not be used. Each of the histograms may be generated based on the region $R_i$ (i=1,2), where $R_1$ corresponds to vessel tissue and $R_2$ corresponds to the lumen of the vessel, and where the combination of $R_1$ and $R_2$ corresponds to the region of interest. The hue histograms are generated based on the hue values in each of the hue images generated in operation 520. Similarly, the saturation histograms are generated based on the saturation values in each of the saturation images generated in operation 520 and the intensity histograms are generated based on the intensity values in each of the intensity images generated in operation 520. In an alternative embodiment, the hue images, the saturation images, and/or the intensity images of operation 520 may not be generated, and the hue, saturation, and/or intensity histograms may be generated directly using the hue values, the saturation values, and/or the intensity values determined in operation 515. An illustrative saturation histogram and an illustrative intensity histogram are illustrated with reference to FIGS. 11A and 11B, respectively.

A threshold for each of the hue, saturation, and/or intensity properties is determined in an operation 530. In an illustrative embodiment, the thresholds are determined based on the maximum entropy principle (MEP) as known to those of skill in the art. A threshold ($T_1$) based on the hue, a threshold ($T_2$) based on the saturation, and a threshold ($T_3$) based on the intensity can be determined according to the following equations:

$$T = \arg\{\text{Max}\{\Phi(t)\}\}, \text{ where } \Phi(t) = E_{R_1} + E_{R_2}$$

and where $$E_{R_i} = -\sum_{k=min(R_i)}^{max(R_i)} p_k \log p_k$$

In the equations above, $E_{R_i}$ is the entropy of the region $R_i$ (i=1,2). For determination of $T_1$, $p_k$ is determined based on the normalized hue histograms. Similarly, for determination of $T_2$, $p_k$ is determined based on the normalized saturation histograms and for determination of $T_3$, $p_k$ is determined based on the normalized intensity histograms. The variable $p_k$ can refer to the value of the normalized histogram in the $k^{th}$ bin (along the x axis) as known to those of skill in the art. Based on the equations above, it can be seen that the three threshold values ($T_1$-$T_3$) may differ from another due to the potentially different normalized histograms for each of the hue, saturation, and intensity properties. In an illustrative embodiment, the threshold calculations do not rely on prior knowledge about the input image statistics (i.e., no assumptions are made based on the nature of the data in determining the thresholds). In alternative embodiments, other variants of the maximum entropy principle known to those of skill in the art may be used to determine the thresholds. In an illustrative embodiment, the threshold values can be determined for each of the captured images.

In one embodiment, a uniformity criterion process may be used to determine the thresholds as known to those of skill in the art. In such an embodiment, a uniformity value U as a function of a threshold (T) can be determined according to the following equation:

$$U(T) = 1 - \frac{\sigma_1^2 + \sigma_2^2}{C_1},$$

where $$\sigma_1^2 = \sum_{(m,n) \in R_i} (f(m,n) - \mu_i)^2$$

for i=1,2 are the values of the variances associated with regions $R_i$ for i=1,2 (based on any of the hue values, the saturation values, and/or the intensity values), and where $$C_1 = \frac{(f_{max} - f_{min})}{2}$$

is used for normalization as known to those of skill in the art. The threshold values (T) for each of the hue, saturation, and/or intensity properties can be determined by maximizing the uniformity value according to the following equation:

$$T = \text{Arg Max}\{U(t)\}.$$

In alternative embodiments, the threshold(s) can be determined using other methods known to those of skill in the art. In an illustrative embodiment, the threshold(s) corresponding to each image can be used to determine whether a given pixel in the image corresponds to vessel tissue or to the lumen of the vessel. As such, the hue value of each pixel in the region of interest of each of the hue images is compared to the hue threshold value $T_1$ in an operation 535. The comparison can depend on the color(s) present in the captured image. In one embodiment, if the hue value of a given pixel is equal to or below the hue threshold value, it can be determined that the given pixel corresponds to the lumen of the blood vessel sample. In an alternative embodiment in which different colors are present in the captured image, if the hue value of a given pixel is equal to or above the hue threshold value, it can be determined that the given pixel corresponds to the lumen of the blood vessel sample. As such, comparison of the hue values can be performed on a case by case basis as known to those of skill in the art. In alternative embodiments, a pixel with a hue value equal to the hue threshold value may be considered to be part of the tissue of the blood vessel sample. Based on the comparisons, the number of pixels corresponding to the lumen of the blood vessel sample is determined for each of the hue images in an operation 540.

The saturation value of each pixel in the region of interest in each of the saturation images is compared to the saturation threshold value $T_2$ in an operation 545. If the saturation value of a given pixel is equal to or below the saturation threshold, it can be determined that the given pixel corresponds to the lumen of the blood vessel sample. If the saturation value of the given pixel is greater than the saturation threshold value, it can be determined that the given pixel corresponds to tissue of the blood vessel sample. Alternatively, a pixel with a saturation value equal to the saturation threshold value may be considered to be part of the tissue of the blood vessel sample. Based on the comparisons, the number of pixels corresponding to the lumen of the blood vessel sample is determined for each of the saturation images in an operation 550.

The intensity value of each pixel in the region of interest in each of the intensity images is compared to the intensity threshold value $T_3$ in an operation 555. If the intensity value of a given pixel is equal to or greater than the intensity threshold, it can be determined that the given pixel corresponds to the lumen of the blood vessel sample. If the intensity value of the given pixel is less than the intensity threshold, it can be determined that the given pixel corresponds to tissue of the blood vessel sample. Alternatively, a pixel with an intensity value equal to the intensity threshold value may be considered to be part of the tissue of the blood vessel sample. Based on the comparisons, the number of pixels corresponding to the lumen of the blood vessel sample is determined for each of the intensity images in an operation 560.

The area of the lumen of the blood vessel sample is determined for each of the hue images in an operation 565. In an illustrative embodiment, the area of the lumen is proportional to the number of pixels that are within the lumen. As such, the area of a pixel, which can be predetermined or determined as known to those of skill in the art, can be multiplied by the number of pixels within the lumen to determine the area of the lumen for a given captured image. In an alternative embodiment, the actual area of the lumen may not be determined, and subsequent analysis may be based on the number of pixels that define the lumen (i.e., because the number of pixels in the lumen is proportional to the area of the lumen).

The area of the lumen of the blood vessel sample is similarly determined for each of the saturation images in an operation 570. The area of the lumen of the blood vessel sample is similarly determined for each of the intensity images in an operation 575. In an alternative embodiment, the actual area of the lumen may not be determined for the saturation images and/or the intensity images, and subsequent analysis may be based on the number of pixels that define the lumen.

In one embodiment, areas as individually determined based on the hue image, the saturation image, and/or the intensity image can be combined by averaging the values to obtain a final determined area of the lumen for each captured image. In one embodiment, any of the three area values may be weighted by methods known to those of skill in the art such that the weighted area value has more or less influence on the determination of the final determined area of the lumen. As an example, the area determined based on the intensity may be weighted to have less influence on the final determined area of the lumen because fluctuations in intensity due to the light source used to illuminate the blood vessel sample may lead to inaccurate results. The hue and saturation properties are not affected by inadvertent fluctuations in light intensity.

In an alternative embodiment, only the saturation images may be used to determine the final area of the lumen of the blood vessel sample in each captured image. In such an embodiment, the hue and/or intensity values may not be determined in operation 515 and/or the hue and/or intensity images may not be generated in operation 520. The inventors have determined that the saturation, which is not affected by inadvertent fluctuations that may occur in the light intensity during the image capturing process, can be used to provide an accurate representation of the area of the lumen. The hue is also independent of fluctuations in light intensity that may occur during the image capturing process. However, certain vaso-active agents may result in captured images in which the hue values of pixels cannot be accurately ascertained due to insufficient contrast. In such situations, hue may not be considered, and the analysis described herein may be based solely on or more of the saturation and intensity (i.e., hue values, hue images, etc. may not be determined or generated). In one embodiment, the light source used to illuminate the blood vessel sample may emit colored light to improve the contrast in captured images such that the hue values can be ascertained. In an embodiment in which hue can be ascertained, only the hue images may be used to determine the final area of the lumen. In alternative embodiments, only the intensity images may be used to determine the final area of the lumen, or a combination of any two of the hue, saturation, and intensity images may be combined and used to determine the final area of the lumen.

In one embodiment, a single lumen area based on a combination of one or more of the hue, saturation, and intensity values may be determined using a form of classification as known to those of skill in the art and as illustrated with reference to an operation 580. In such an embodiment, individual lumen areas based on hue, saturation, and/or intensity may not be determined. The classification process can be used to determine the lumen area in each of the captured images. In an illustrative embodiment, a vector (x) can be formed for each pixel in the region of interest for each captured image. The vector can be formed based on one or more of the hue value of the pixel, the saturation value of the pixel, and the intensity value of the pixel. The vector can be formed in a three dimensional HSI (hue, saturation, intensity) space as known to those of skill in the art.

In an illustrative embodiment, the pixel can be segmented based on the location of its corresponding vector in the HSI space. The values of hue, saturation, and/or intensity associated with the pixels in the lumen can be similar for each of the pixels in the lumen. As such, the vectors corresponding to pixels in the lumen can form a close cluster in a first region of the three dimensional HSI space. Similarly, the vectors corresponding to pixels in the tissue can form a cluster in at least a second region of the HSI space. As such, the HSI space can include at least one region (or cluster) corresponding to the lumen of the blood vessel sample and at least one region (or cluster) corresponding to the tissue of the blood vessel sample that is within the region of interest. The pixel can be classified based on where its corresponding vector falls within the HSI space. The Mahalanobis distance (as known to those of skill in the art) can be used to specify the position of the vector relative to a given region (or cluster) of the HSI space.

As an example, a first region of the HSI space may correspond to the lumen and a second region of the HSI space may correspond to the tissue surrounding the lumen. If the vector (x) corresponding to a given pixel is closer, based on the Mahalanobis distance, to the first region of the HSI space than it is to the second region of the HSI space, then the given pixel can be classified as corresponding to the lumen of the blood vessel sample. If the vector (x) corresponding to the given pixel is closer, based on the Mahalanobis distance, to the second region of the HSI space than it is to the first region of the HSI space, then the given pixel can be classified as corresponding to the tissue of the blood vessel sample that surrounds the lumen. As such, classification can be used to segment each pixel within the region of interest for each of the captured images based on one or more of the hue value of the pixel, the saturation value of the pixel, and the intensity value of the pixel. The use of more than one property (i.e., hue, saturation, and/or intensity) can yield more accurate segmentation results. Use of more than one property may also be desirable in the event that a captured image has poor contrast.

In one embodiment, a calibration process may be used to determine an actual area of the lumen based on the number of pixels within the area. In such an embodiment, a patch of material can be placed on the sample platform of the microscope and in the field of view of the camera. In an illustrative embodiment, the patch can be brightly colored to aid in pixel segmentation of an image of the patch. The material can be cloth, paper, foil, etc. The patch can have a known area (A). An image of the patch can be captured using the camera. The image can be analyzed using the sample analysis software, and the number of pixels (N) corresponding to the patch can be determined using any of the methods described herein. The area corresponding to a single pixel can readily be determined using the known area (A) of the patch and the number of pixels (N) corresponding to the patch (i.e., area per pixel=A/N). The actual area of the lumen can be determined by multiplying the number of pixels determined to be in the lumen by the determined area per pixel. Depending on the embodiment, the calibration can be performed before or after capturing images of the blood vessel sample in response to the vaso-active agent.

The area of the lumen (i.e., the final determined area for each of the captured images) is plotted as a function of time in an operation 585. As indicated above, the final determined area may be based on one or more of the hue, the saturation, and the intensity of the pixels in the region of interest in each captured image. In an illustrative embodiment, the plot of the area of the lumen as a function of time can be used to characterize the physical response of the blood vessel sample to the application of the vaso-active agent. For example, if the area of the blood vessel lumen decreases over time (as a result of application of the vaso-active agent), it can be determined that the vaso-active agent acts to constrict the blood vessel. If the area of the vessel lumen increases over time (as a result of application of the vaso-active agent), it can be determined that the vaso-active agent acts to dilate the blood vessel. If the area of the vessel remains the same (after application of the vaso-active agent), it may be determined that the vaso-active agent does not affect the blood vessel.

The sample analysis software can also be used to determine the shape of the lumen of the blood vessel sample and how the shape changes as a result of application of the vaso-active agent. The shape of the lumen in each of the captured images can be determined based on an identification of the outermost group of pixels (relative to a center of the lumen) that are determined to be part of the lumen based on the hue, saturation, and/or intensity thresholds. Determination of lumen shape can be used to help treat and prevent diseases and disorders that may be triggered by abnormally shaped blood vessels. For example, a portion of an aorta may lack collagen, resulting in an abnormal shape as blood flows through the aorta. The abnormal shape, which can be due to weakness in the portion of the aorta that lacks collagen, may lead to an aneurysm. Diseases such as atherosclerosis and diabetes are also known to affect the shape of blood vessels. The analysis described above may be used to help determine if an applied vaso-active agent helps to correct the shape of a blood vessel sample.

A peripheral (vascular) resistance of the blood vessel sample can also be determined based at least in part on a radius of the lumen of the blood vessel sample. If the lumen is substantially circular in shape, the radius of the lumen can be determined using the area of the lumen as known to those of skill in the art. The peripheral resistance, which is inversely proportional to the $4^{th}$ power of the radius of the lumen, can be determined using Poisuelle's Law as known to those of skill in the art.

The determined physical response of the blood vessel sample can be used to help determine whether the vaso-active agent can be used as a drug to help treat and/or prevent blood vessel diseases such as hypertension, vasospasm, etc. The determined physical response of the blood vessel sample can be used to validate claims of the effects of drugs, study the properties of drugs, etc. The determined physical response can also be used to determine whether an agent is a vaso-active agent (i.e., to identify new vaso-active agents). The determined physical response can further be used to identify the types of receptors present in the blood vessel sample, study the receptor physiology of the blood vessel sample, etc.

Figure 7:
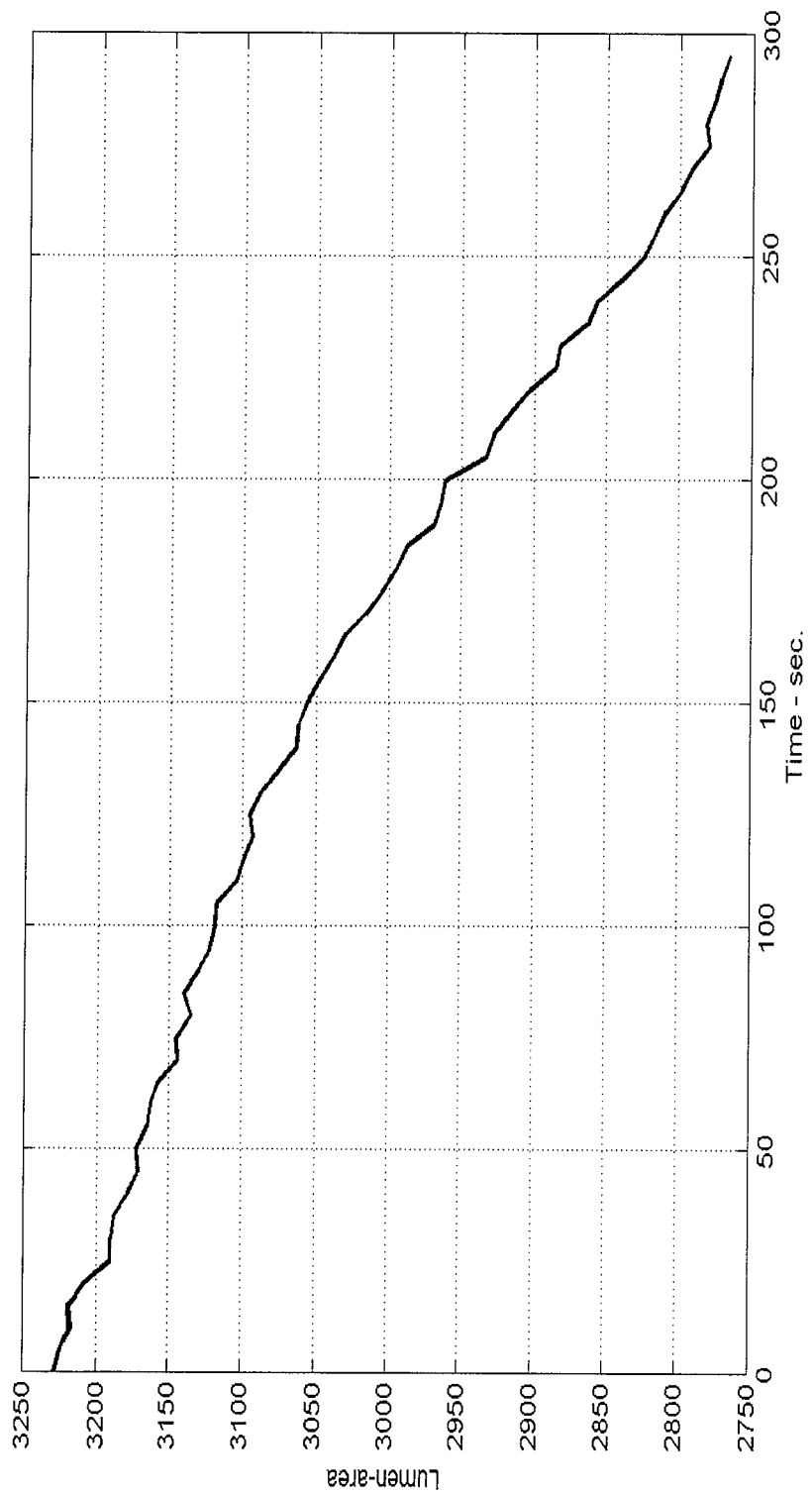
FIG. 7 depicts a plot of lumen area of a blood vessel as a function of time in accordance with an illustrative embodiment.

FIG. 7 depicts a plot of lumen area of a blood vessel as a function of time (in seconds) in accordance with an illustrative embodiment. In FIG. 7, the blood vessel sample used originated from a frog and the vaso-active agent used was adrenaline. FIG. 7 illustrates that the adrenaline caused the blood vessel sample to contract, resulting in a decrease in the area of the lumen of the blood vessel sample.

Figure 8:
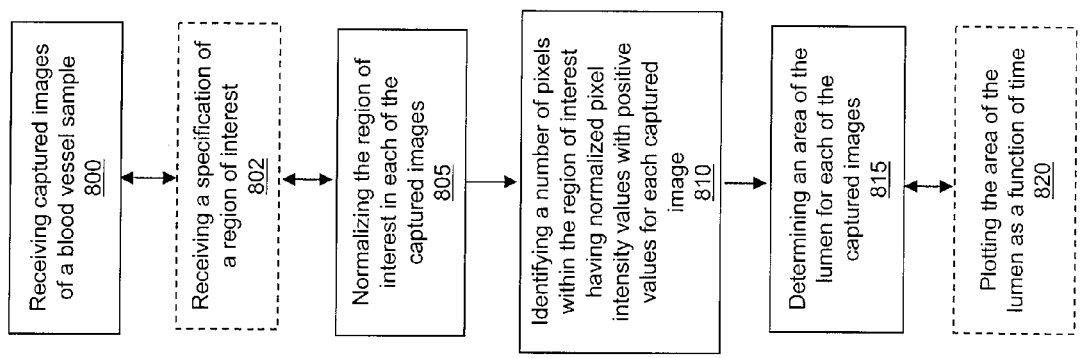
FIG. 8 is a flow diagram illustrating blood vessel sample analysis operations performed in accordance with a second illustrative embodiment.

FIG. 8 is a flow diagram illustrating blood vessel sample analysis operations performed in accordance with a second illustrative embodiment. In alternative embodiments, fewer, additional, and/or different operations may be performed. The use of dashed boxes and double arrows in FIG. 8 refers to operations that may be optional. In an illustrative embodiment, the blood vessel sample analysis operations can be performed by sample analysis software 140 described with reference to FIG. 1. Captured images of a blood vessel sample are received in an operation 800. The images can be captured as described with reference to FIG. 4. The captured images can be received at a computing device such as computing device 120 described with reference to FIG. 1 through a wired or wireless connection with a camera. A specification of a region of interest is received in an operation 802. The region of interest can be specified and received as described with reference to FIGS. 5 and 6. In an alternative embodiment in which the field of view of the camera is adjusted to include only the region of interest, the region of interest may not be specified by a user. The region of interest is normalized in each of the captured images in an operation 805. In one embodiment, the region of interest can be normalized by subtracting a mean pixel intensity value (i.e., an average pixel intensity value of all of the pixel intensity values within the region of interest of a given image) from an actual pixel intensity value and dividing the result by a standard deviation of the pixel intensity values to obtain a normalized pixel intensity value for each pixel in the region of interest. The pixel intensity values can be determined using the intensity equation described with reference to FIG. 5. In an alternative embodiment, saturation values may be used.

The number of pixels within the region of interest having normalized pixel intensity values with positive values are identified for each captured image in an operation 810. In an illustrative embodiment, the intensity is relatively high and uniform in the pixels of the image corresponding to the lumen. Also, the intensity in pixels of the image corresponding to tissue layers of the blood vessel sample may be lower and less uniform than that of the pixels corresponding to the lumen. Further, as known to those of skill in the art, the region of interest can have an aggregate mean of zero by virtue of the normalization (i.e., the sum of the normalized pixel values in the region of interest can be zero). As such, the normalized pixel values in the region of interest will have both positive and negative values. The pixels corresponding to the lumen should have large positive values (i.e., because the intensity of pixels in the lumen should be higher than that of pixels corresponding to the tissue). Also, based on the selection of a region of interest with only a small portion of tissue surrounding the lumen, there should be a larger number of pixels in the lumen than in the tissue. As such, the pixels with positive normalized values can correspond to pixels located in the lumen of the blood vessel sample. Pixels with negative normalized values can correspond to pixels located in one of the tissue layers of the blood vessel sample. The negative normalized values may be large to cancel out the more numerous positive values (corresponding to pixels in lumen) and result in a mean in the region of interest of zero as indicated above. In an embodiment in which saturation values are used instead of intensity, negative normalized values can correspond to pixels located in the lumen and pixels with positive normalized values can be pixels located in one of the tissue layers. In one embodiment, pixels with low positive normalized pixel intensity values may also be considered to be located in one of the tissue layers and not in the lumen of the blood vessel sample.

The area of the lumen of the blood vessel sample is determined for each of the captured images in an operation 815. In an illustrative embodiment, the area of the lumen is proportional to the number of pixels that are within the lumen. As such, the area of a pixel, which can be predetermined or determined as known to those of skill in the art, can be multiplied by the number of pixels within the lumen to determine the area of the lumen for a given image. In an alternative embodiment, the actual area of the lumen may not be determined, and subsequent analysis may be based on the number of pixels that define the lumen (i.e., because the number of pixels in the lumen is proportional to the area of the lumen). The area of the lumen (i.e., the determined area for each of the captured images) is plotted as a function of time in an operation 820. As discussed above, the plot, which can represent a physical response of the blood vessel sample to a vaso-active agent, can be used to characterize, study, etc. the vaso-active agent.

Figure 9:
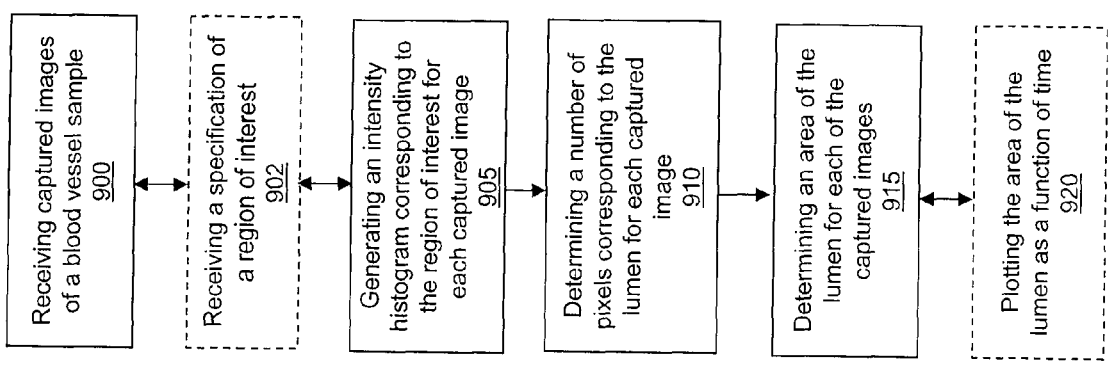
FIG. 9 is a flow diagram illustrating blood vessel sample analysis operations performed in accordance with a third illustrative embodiment.
Figure 11B:
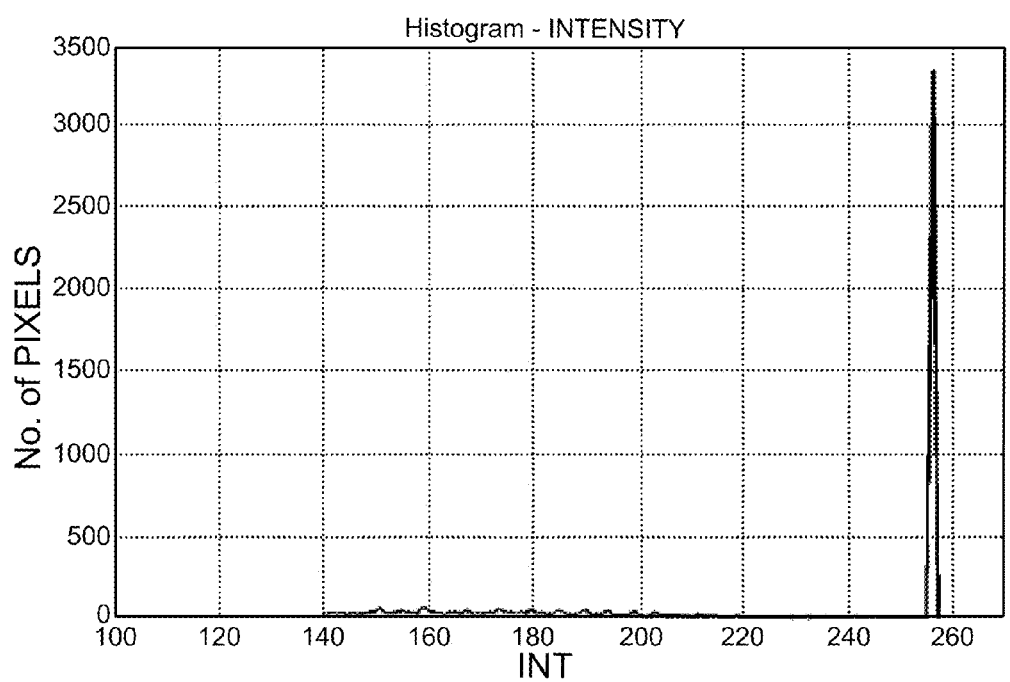

FIG. 9 is a flow diagram illustrating blood vessel sample analysis operations performed in accordance with a third illustrative embodiment. In alternative embodiments, fewer, additional, and/or different operations may be performed. The use of dashed boxes and double arrows in FIG. 9 refers to operations that may be optional. In an illustrative embodiment, the blood vessel sample analysis operations can be performed by sample analysis software 140 described with reference to FIG. 1. Captured images of a blood vessel sample are received in an operation 900. The images can be captured as described with reference to FIG. 4. The captured images can be received at a computing device such as computing device 120 described with reference to FIG. 1 through a wired or wireless connection with a camera. A specification of a region of interest is received in an operation 902. The region of interest can be specified and received as described with reference to FIGS. 5 and 6. In an alternative embodiment in which the field of view of the camera is adjusted to include only the region of interest, the region of interest may not be specified by a user. An intensity histogram corresponding to the region of interest is generated for each captured image in an operation 905. The intensity of pixels in the captured images can be determined as described with reference to FIG. 5 or by any other method known to those of skill in the art. An illustrative histogram based on intensity is illustrated in FIG. 11B.

The number of pixels corresponding to the lumen is determined for each captured image based on the intensity histogram corresponding to the captured image in an operation 910. As indicated above, the intensity is relatively high and uniform in the pixels of the image corresponding to the lumen. Also, the intensity in pixels of the image corresponding to tissue layers of the blood vessel sample is generally lower and less uniform than that of the pixels corresponding to the lumen. As such, a peak in the intensity histogram can correspond to pixels of the captured image that are within the lumen of the blood vessel sample. Pixels having an intensity that is within a predetermined threshold of the peak intensity value may also be considered to correspond to the lumen. The predetermined threshold can be within approximately ±0.5% of the peak value, within approximately ±1% of the peak value, within approximately ±3% of the peak value, within approximately ±5% of the peak value, etc. In an illustrative embodiment, the number of pixels in each captured image corresponding to the peak can be determined by a summation of the number of pixels (i.e., integration) within the area on the histogram that is within the predetermined threshold of the peak.

The area of the lumen of the blood vessel sample is determined for each of the captured images in an operation 915. In an illustrative embodiment, the area of the lumen is proportional to the number of pixels that are within the lumen. As such, the area of a pixel, which can be predetermined or determined as known to those of skill in the art, can be multiplied by the number of pixels within the lumen to determine the area of the lumen for a given image. In an alternative embodiment, the actual area of the lumen may not be determined, and subsequent analysis may be based on the number of pixels that define the lumen (i.e., because the number of pixels in the lumen is proportional to the area of the lumen). The area of the lumen (i.e., the determined area for each of the captured images) is plotted as a function of time in an operation 920. As discussed above, the plot, which can represent a physical response of the blood vessel sample to a vaso-active agent, can be used to characterize, study, etc. the vaso-active agent.

Figure 10A:
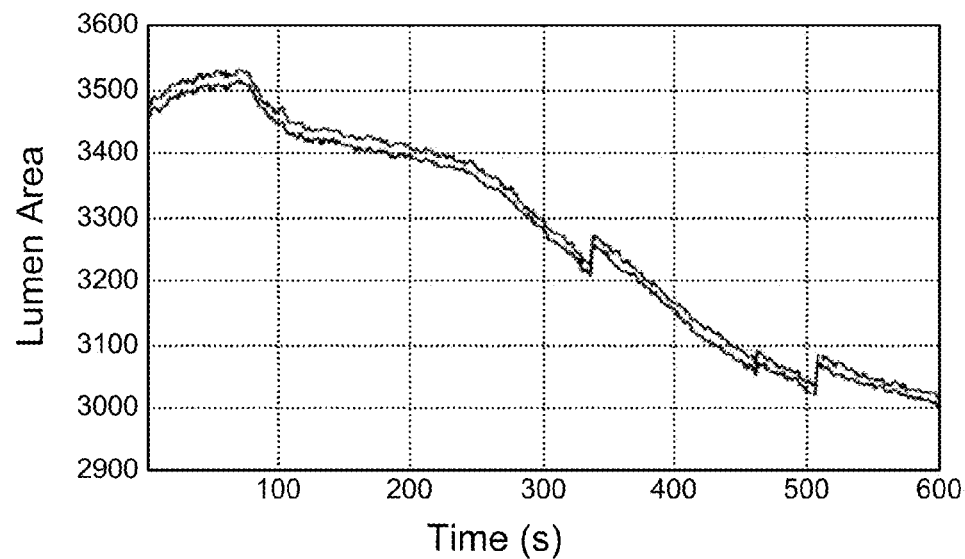
FIGS. 10A-10D depict experimentally obtained plots of lumen area of a blood vessel sample with respect to time in accordance with illustrative embodiments.
Figure 10B:
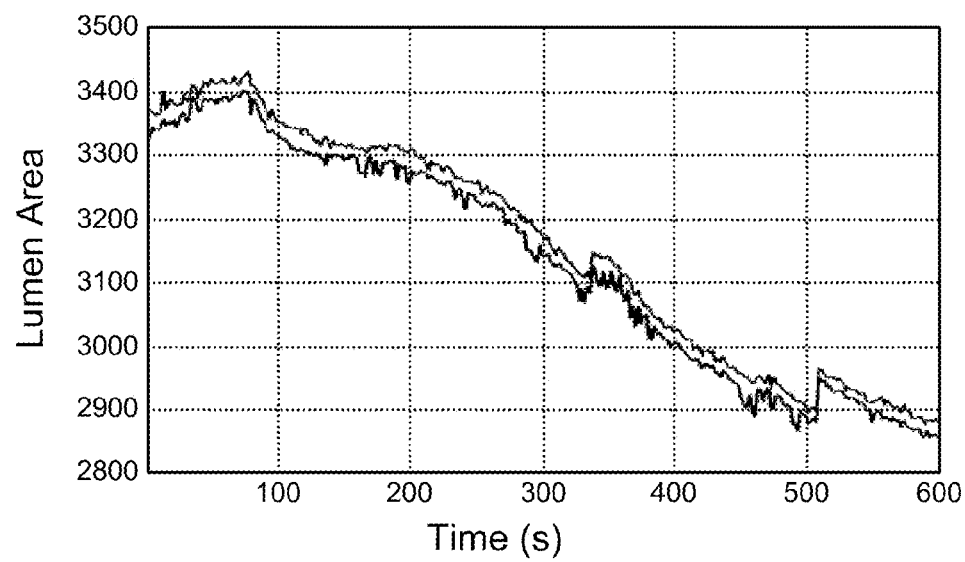
Figure 10C:
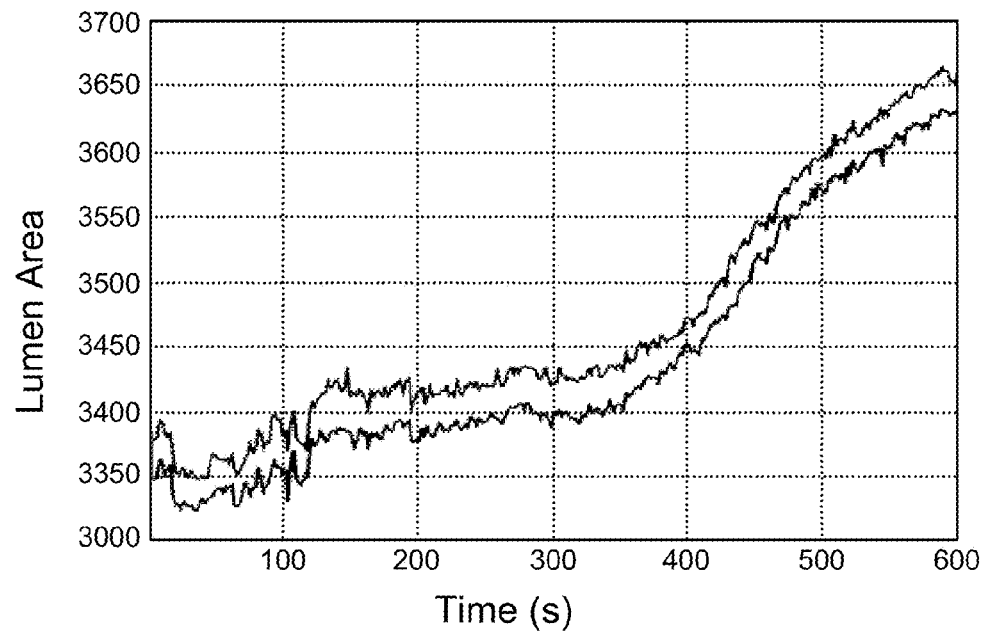
Figure 10D:
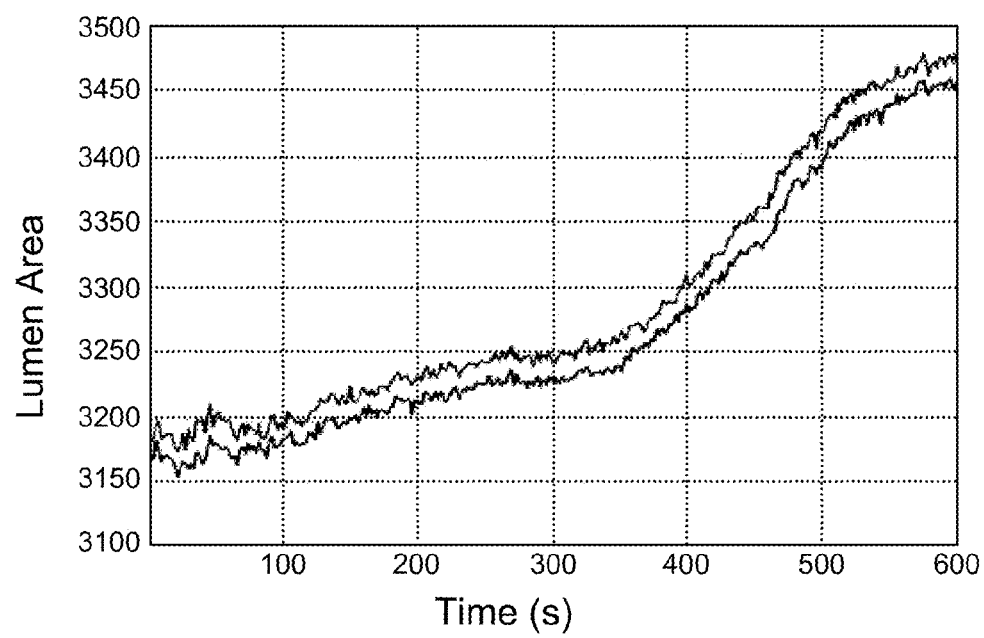

FIGS. 10A-10D depict experimentally obtained plots of lumen area of a blood vessel sample with respect to time (in seconds) in accordance with illustrative embodiments. The blood vessel samples used to obtain the results in FIGS. 10A-10D were obtained from the aorta of a frog. In alternative embodiments, different blood vessels within the frog, blood vessels obtained from different animals, and/or blood vessels obtained from humans may be used. FIGS. 10A and 10B illustrate the responses of blood vessel samples to the application of the vaso-active agent potassium chloride. FIGS. 10C and 10D illustrate the responses of blood vessel samples to the application of the vaso-active agent caffeine.

The plots of FIGS. 10A and 10C were generated based on pixel intensity in the region of interest of the captured images. Further, the bottom curve in each of FIGS. 10A and 10C was generated using the process described with reference to FIG. 9. The upper curve in each of FIGS. 10A and 10C was generated using the process described with reference to FIG. 5 in which only the generated intensity (I) images were used (i.e., hue and saturation were not considered). The plots of FIGS. 10B and 10D were generated based on pixel saturation in the region of interest of the captured images. The bottom curve in each of FIGS. 10B and 10D was generated using the process described with reference to FIG. 9 (i.e., in which the histograms were generated based on pixel saturation instead of pixel intensity). The upper curve in each of FIGS. 10B and 10D was generated using the process described with reference to FIG. 5 in which only the generated saturation (S) images were used.

The inventors have determined that the lumen area based on intensity (as depicted in FIGS. 10A and 10C) resulted in an overestimate of approximately 200 pixels (~6.5%) and 120 pixels (~5%), respectively. This may be due in part to a bright illumination of the captured images at the boundary between the lumen and the tissue of the blood vessel sample. The determination of area based on the saturation property was more accurate due in part to a sharp change in the saturation property at the boundary between the lumen and the tissue of the blood vessel sample. The inventors also experimentally determined that determining the area based on a combination of the saturation and intensity properties (as described with reference to FIG. 5) did not significantly increase the accuracy that was obtained based on use of the saturation property alone.

The embodiments disclosed herein have been described primarily with reference to the analysis of blood vessels. It is important to understand that the disclosed embodiments are not limited to blood vessel analysis. For example, the embodiments described herein can be used to analyze any human or non-human tissue that includes a lumen. Further, the embodiments described herein are not limited to application of vaso-active agents. Other tissue affecting fluids, substances, chemicals, etc. known to those of skill in the art may also be used.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
capturing a first image of a blood vessel sample at a time prior to application of a vaso-active agent to the blood vessel sample, wherein a timestamp is associated with the image;
determining, by a computing device, a first hue value, a first saturation value, and a first intensity value for each of a first plurality of pixels in a region of interest of the first image of the blood vessel sample;
capturing a plurality of subsequent images of the blood vessel sample during and after application of the vaso-active agent to the blood vessel sample, wherein a timestamp is associated with each subsequent image;
determining, by the computing device, for each subsequent image, a subsequent hue value, a subsequent saturation value, and a subsequent intensity value for each of a plurality of pixels in the region of interest of the subsequent image of the blood vessel sample;
determining, by the computing device, a first number of pixels that correspond to a lumen of the blood vessel sample based at least in part on the first hue value, the first saturation value, and the first intensity value of each of the first plurality of pixels in the region of interest of the first image;
determining, by the computing device, a first area of the lumen of the blood vessel sample based on the first number of pixels and a known area of a single pixel;
determining, by the computing device, for each of the plurality of subsequent images, a subsequent number of pixels that correspond to the lumen of the blood vessel sample based at least in part on the subsequent hue value, the subsequent saturation value, and the subsequent intensity value of each of the subsequent plurality of pixels in the region of interest of the subsequent image;
determining, by the computing device, for each of the plurality of subsequent images, a subsequent area of the lumen of the blood vessel sample based on the subsequent number of pixels and the known area of the single pixel;
determining, by the computing device, a physical response of the blood vessel sample to a vaso-active agent based at least in part on a comparison of the determined areas of the lumen of the blood vessel sample, wherein the physical response comprises a change in area of the lumen of the blood vessel sample; and
plotting, by the computing device, the change in area of the lumen as a function of time.

2. The method of claim 1, further comprising:
generating, for each image, a hue image based at least in part on the hue value for each of the plurality of pixels in the region of interest of the image, a saturation image based at least in part on the saturation value for each of the plurality of pixels in the region of interest of the image, and an intensity image based at least in part on the intensity value for each of the plurality of pixels in the region of interest of the image; and
generating, for each image, a normalized hue histogram based at least in part on the hue image, a normalized saturation histogram based at least in part on the saturation image, and a normalized intensity histogram based at least in part on the intensity image.

3. The method of claim 2, further comprising:
Determining, for each image, a hue threshold based at least in part on the normalized hue histogram, a saturation threshold based at least in part on the normalized saturation histogram, and an intensity threshold based at least in part on the normalized intensity histogram;
comparing, for each image, the hue value for each of the plurality of pixels in the region of interest of the image to the hue threshold, the saturation value for each of the plurality of pixels in the region of interest of the image to the saturation threshold, and the intensity value for each of the plurality of pixels in the region of interest of the image to the intensity threshold; and
determining, for each image, based at least in part on the comparison, whether a pixel of the plurality of pixels in the region of interest of the image corresponds to tissue of the blood vessel sample or to the lumen of the blood vessel sample.

4. The method of claim 3, wherein one or more of the hue threshold, the saturation threshold, and the intensity threshold are determined using a maximum entropy principle.

5. The method of claim 1, further comprising generating, for each image, a histogram based at least in part on one or more of the hue value, the saturation value, and the intensity value for each of the plurality of pixels in the region of interest of the image.

6. The method of claim 5, further comprising:
identifying a peak of each histogram; and
determining an area of the peak of each histogram, wherein the physical response of the blood vessel sample is based at least in part on the area of the peak of the histogram, and wherein the area of the peak of the histogram corresponds to the area of the lumen of the blood vessel sample.

7. The method of claim 1, further comprising applying the vaso-active agent to at least a portion of the blood vessel sample.

8. The method of claim 1, further comprising:
receiving a specification of the region of interest on the first image, wherein the region of interest includes at least the lumen of the blood vessel sample; and
transposing the region of interest onto the subsequent images of the blood vessel sample.

9. The method of claim 1, further comprising determining, for each image, a normalized value for each of the plurality of pixels in the region of interest of the image based at least in part on of the hue value, the saturation value, and the intensity value for each of the plurality of pixels in the region of interest of the image, wherein the area of the lumen is determined based at least in part on the normalized value.

10. The method of claim 1, further comprising determining, for each image, a red value, a green value, and a blue value for each of the plurality of pixels in the region of interest of the image, wherein the hue value, the saturation value, and the intensity value are based at least in part on the red value, the green value, and the blue value.

11. A system comprising:
a memory configured to store a first image of a blood vessel sample captured at time prior to application of a vaso-active agent to the blood vessel sample, wherein a timestamp is associated with the image;
the memory configured to store a plurality of subsequent images of the blood vessel sample captured during and after application of the vaso-active agent to the blood vessel sample, wherein a timestamp is associated with each subsequent image; and
a processor operatively coupled to the memory and configured to:
determine a first hue value, a first saturation value, and a first intensity value for each of a first plurality of pixels in a region of interest of the first image of the blood vessel sample;
determine, for each subsequent image, a subsequent hue value, a subsequent saturation value, and a subsequent intensity value for each of a subsequent plurality of pixels in the region of interest of the subsequent image of the blood vessel sample;
determine a first number of pixels that correspond to a lumen of the blood vessel sample based at least in part on the first hue value, the first saturation value, and the first intensity value of each of the first plurality of pixels in the region of interest of the first image;
determine a first area of the lumen of the blood vessel sample based on the first number of pixels and a known area of a single pixel;
determine, for each of the plurality of subsequent images, a subsequent number of pixels that correspond to the lumen of the blood vessel sample based at least in part on the subsequent hue value, the subsequent saturation value, and the subsequent intensity value of each of the subsequent plurality of pixels in the region of interest of the subsequent image;
determine, for each of the plurality of subsequent images, a subsequent area of the lumen of the blood vessel sample based on the subsequent number of pixels and the known area of the single pixel;
determine a physical response of the blood vessel sample to a vaso-active agent based at least in part on a comparison of the determined areas of the lumen of the blood vessel sample, wherein the physical response comprises a change in area of the lumen of the blood vessel sample; and
plot the change in area of the lumen as a function of time.

12. The system of claim 11, further comprising:
a chamber configured to receive the blood vessel sample and the vaso-active agent that is applied to the blood vessel sample; and
a camera configured to capture the first image and the subsequent images of the blood vessel sample.

13. The system of claim 11, further comprising a light source configured to illuminate the blood vessel sample, wherein the light source is mounted underneath a sample platform of a microscope.

14. The system of claim 11, wherein the processor is further configured to identify, for each image, a red value, a green value, and a blue value for each of the plurality of pixels in the region of interest of the image, and wherein the hue value, the saturation value, and the intensity value are determined based at least in part on the red value, the green value, and the blue value.

15. The system of claim 11, wherein the processor is further configured to:
generate, for each image, a histogram based at least in part on the hue value, the saturation value, and the intensity value for each of the plurality of pixels in the region of interest of the image; and
determine, for each image, a hue threshold, a saturation threshold, and an intensity threshold based at least in part on the histogram, wherein the number of pixels that correspond to the lumen of the blood vessel sample is determined based at least in part on the hue threshold, the saturation threshold, and the intensity threshold.

16. A non-transitory computer-readable medium having instructions stored thereon that, when executed by a processor, cause the processor to perform the following operations:
store, in a memory, a first image of a blood vessel sample captured at time prior to application of a vaso-active agent to the blood vessel sample, wherein a timestamp is associated with the image;
store, in the memory, a plurality of subsequent images of the blood vessel sample captured during and after application of the vaso-active agent to the blood vessel sample, wherein a timestamp is associated with each subsequent image; and
determine a first hue value, a first saturation value, and a first intensity value for each of a first plurality of pixels in a region of interest of a first image of a blood vessel sample;
determine, for each of the plurality of subsequent images, a subsequent hue value, a subsequent saturation value, and a subsequent intensity value for each of a subsequent plurality of pixels in the region of interest of a subsequent image of the blood vessel sample;
determine a first number of pixels that correspond to a lumen of the blood vessel sample based at least in part on the first hue value, the first saturation value, and the first intensity value of each of the first plurality of pixels in the region of interest of the first image;

determine a first area of the lumen of the blood vessel sample based on the first number of pixels and a known area of a single pixel;

determine, for each of the plurality of subsequent images, a subsequent number of pixels that correspond to the lumen of the blood vessel sample based at least in part on subsequent hue value, the subsequent saturation value, and the subsequent intensity value of each of subsequent plurality of pixels in the region of interest of the subsequent image;

determine, for each of the plurality of subsequent images, a subsequent area of the lumen of the blood vessel sample based on the second number of pixels and the known area of the single pixel;

instructions for determining a physical response of the blood vessel sample to a vaso-active agent based at least in part on a comparison of the determined areas of the lumen of the blood vessel sample, wherein the physical response comprises a change in area of the lumen of the blood vessel sample; and plot the change in area of the lumen as a function of time.

17. The non-transitory computer-readable medium of claim 16, further comprising instructions to cause the processor to transpose the region of interest of the first image onto the subsequent images of the blood vessel sample, wherein the region of interest includes at least the lumen of the blood vessel sample.

18. The non-transitory computer-readable medium of claim 16, further comprising instructions to cause the processor to perform the following operations:

generate, for each image, a hue image based at least in part on the hue value for each of the plurality of pixels in the region of interest of the image, a saturation image based at least in part on the first saturation value for each of the plurality of pixels in the region of interest of the image, and an intensity image based at least in part on the intensity value for each of the first plurality of pixels in the region of interest of the image;

generate, for each image, a normalized hue histogram based at least in part on the hue image, a normalized saturation histogram based at least in part on the saturation image, and a normalized intensity histogram based at least in part on the intensity Image;

determine, for each image, a hue threshold based at least in part on the normalized hue histogram, a saturation threshold based at least in part on the normalized saturation histogram, and an intensity threshold based at least in part on the normalized intensity histogram;

comparing, for each image, the hue value to the hue threshold, the saturation value to the saturation threshold, and the intensity value to the intensity threshold; and determine, for each image, based at least in part on the comparison, whether each of the first plurality of pixels in the region of interest of the image correspond to tissue of the blood vessel sample or to the lumen of the blood vessel sample.

* * * * *

UNITED STATES PATENT AND TRADEMARK OFFICE
CERTIFICATE OF CORRECTION

PATENT NO. : 8,929,622 B2  
APPLICATION NO. : 12/634260  
DATED : January 6, 2015  
INVENTOR(S) : Galigekere et al.

Page 1 of 1

It is certified that error appears in the above-identified patent and that said Letters Patent is hereby corrected as shown below:

On the title page

On Page 2, item (56), under "OTHER PUBLICATIONS", in Column 1, Line 5, delete "Agnonists,""" and insert -- Agonists," --, therefor.

On Page 2, item (56), under "OTHER PUBLICATIONS", in Column 1, Line 6, delete "Therepeutics," and insert -- Therapeutics, --, therefor.

In the specification

In Column 13, Line 23, delete " $\sigma_1^2 = \sum_{(m,n) \in R_i} (f(m,n) - \mu_i)^2$ " and insert -- $\sigma_i^2 = \sum_{(m,n) \in R_i} (f(m,n) - \mu_i)^2$ --, therefor.

In Column 17, Line 4, delete "Poisuelle's" and insert -- Poiseuille's --, therefor.

In the claims

In Column 22, Line 48, in Claim 3, delete "Determining," and insert -- determining, --, therefor.

In Column 23, Line 26, in Claim 9, delete "part on of" and insert -- part on --, therefor.

In Column 25, Line 11, in Claim 16, delete "each of" and insert -- each of the --, therefor.

In Column 26, Line 16, in Claim 18, delete "Image;" and insert -- image; --, therefor.

Signed and Sealed this  
Twenty-seventh Day of October, 2015

Michelle K. Lee  
*Director of the United States Patent and Trademark Office*